United States Patent [19]

Strunc

[11] 4,156,170

[45] May 22, 1979

[54] STEPPER MOTOR CONTROL

[75] Inventor: Gerald R. Strunc, Maple Grove, Minn.

[73] Assignee: Pako Corporation, Minneapolis, Minn.

[21] Appl. No.: 837,988

[22] Filed: Sep. 29, 1977

[51] Int. Cl.² .......................................... H02K 37/00
[52] U.S. Cl. .................................................... 318/696
[58] Field of Search ............... 318/696, 685, 138, 254; 235/151.11; 307/271, 225; 328/34, 41, 44, 74

[56] References Cited

U.S. PATENT DOCUMENTS 3,908,195  9/1975  Leenhouts ............................ 318/696
4,075,544  2/1978  Leenhouts ............................ 318/696

Primary Examiner—Gene Z. Rubinson
Attorney, Agent, or Firm—Kinney, Lange, Westman and Fairbairn

[57] ABSTRACT

A microprocessor controls the operation of a stepper motor. A look-up table containing a sequence of numbers is used to generate up ramp or down ramp speed control of the stepper motor. The microprocessor supplies numbers from the look-up table to a stepper motor speed control, which causes the stepper motor to step at rates determined by the numbers supplied by the microprocessor.

12 Claims, 29 Drawing Figures

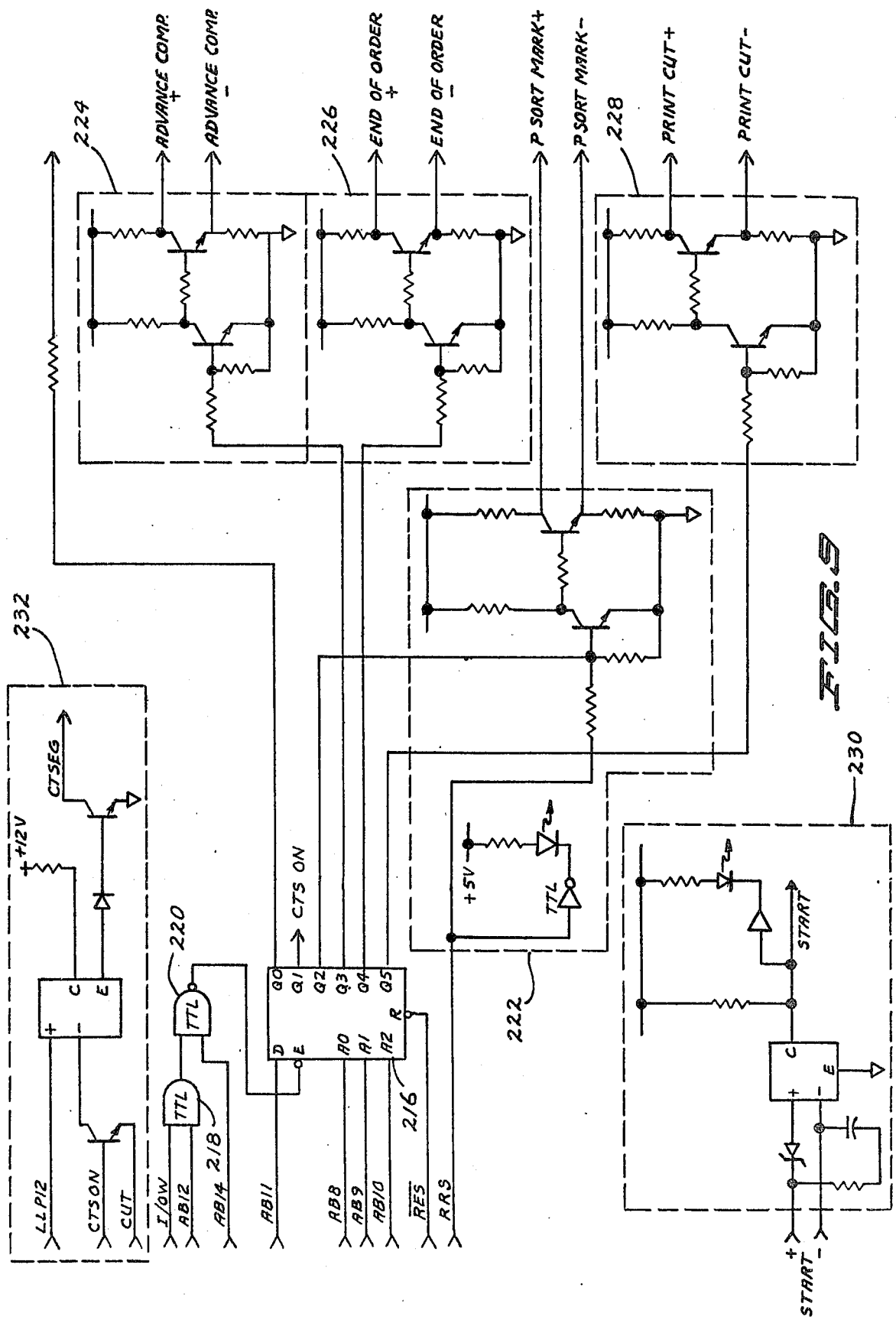

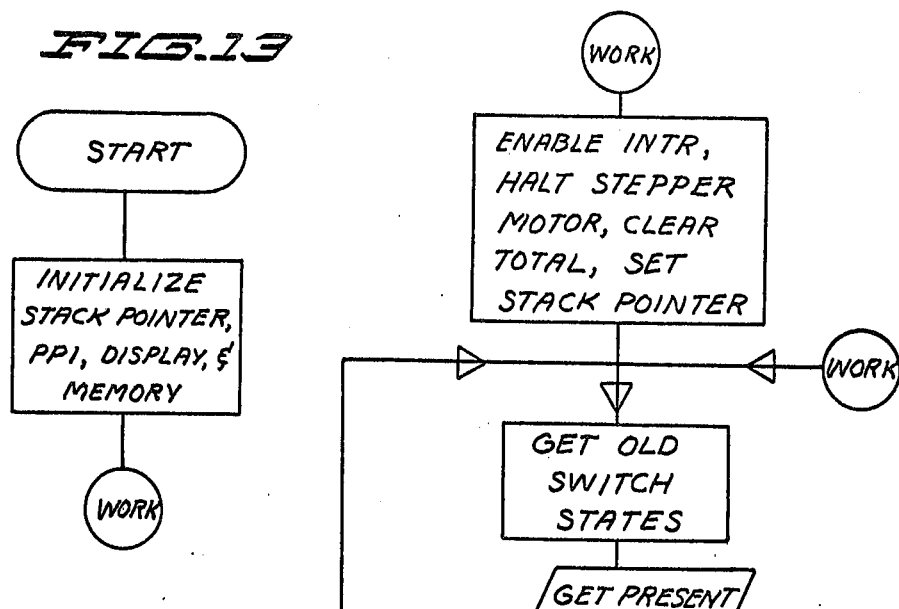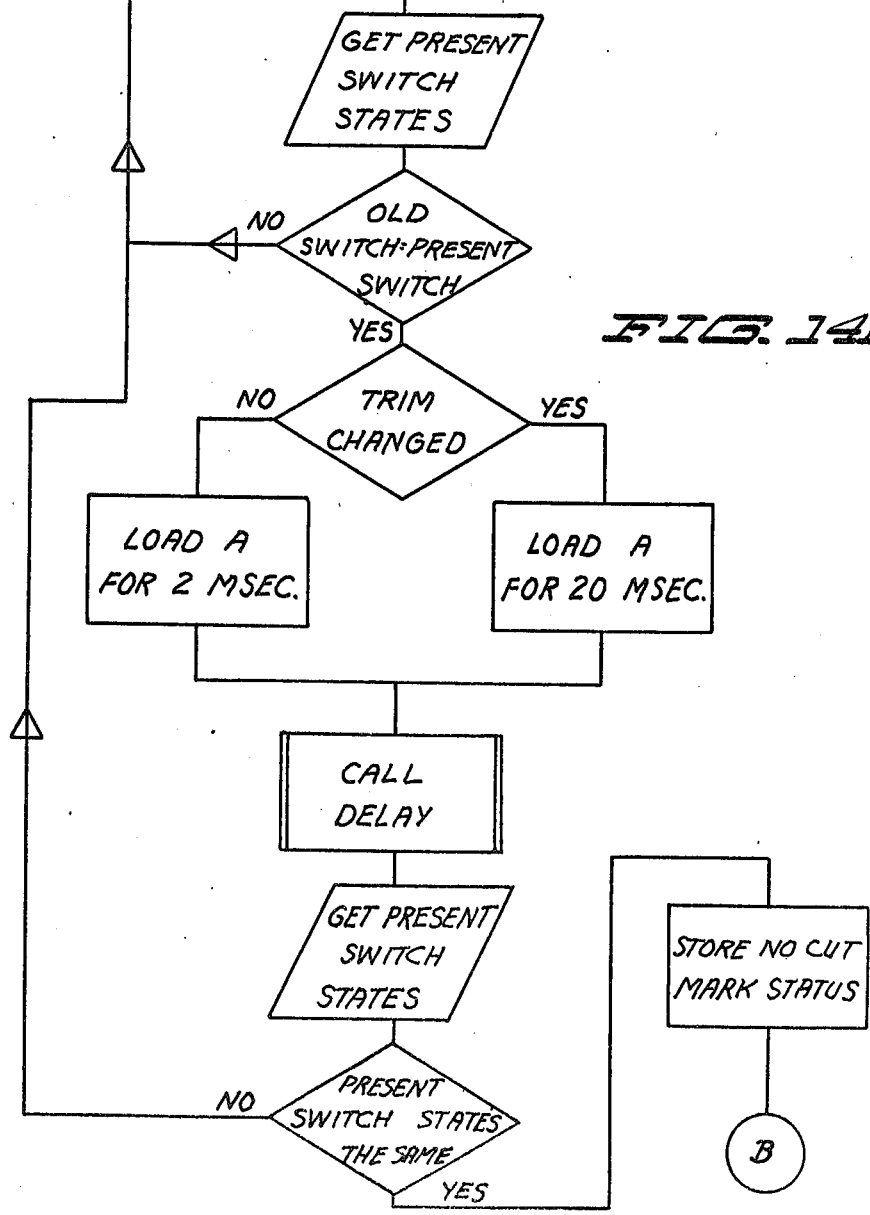

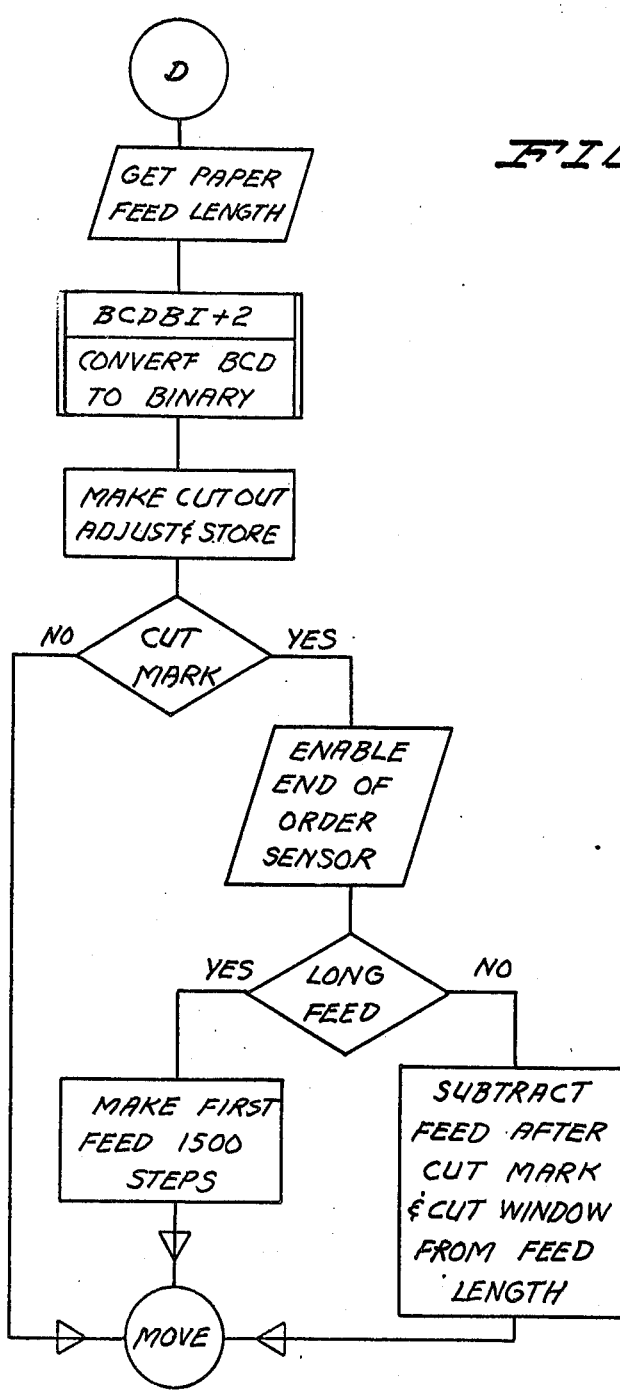
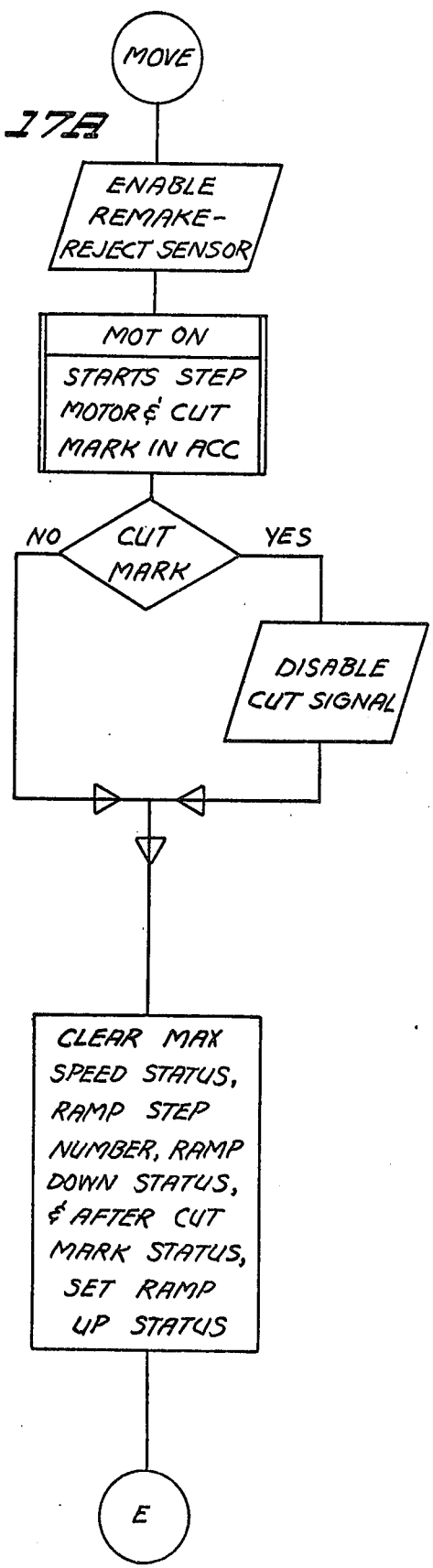

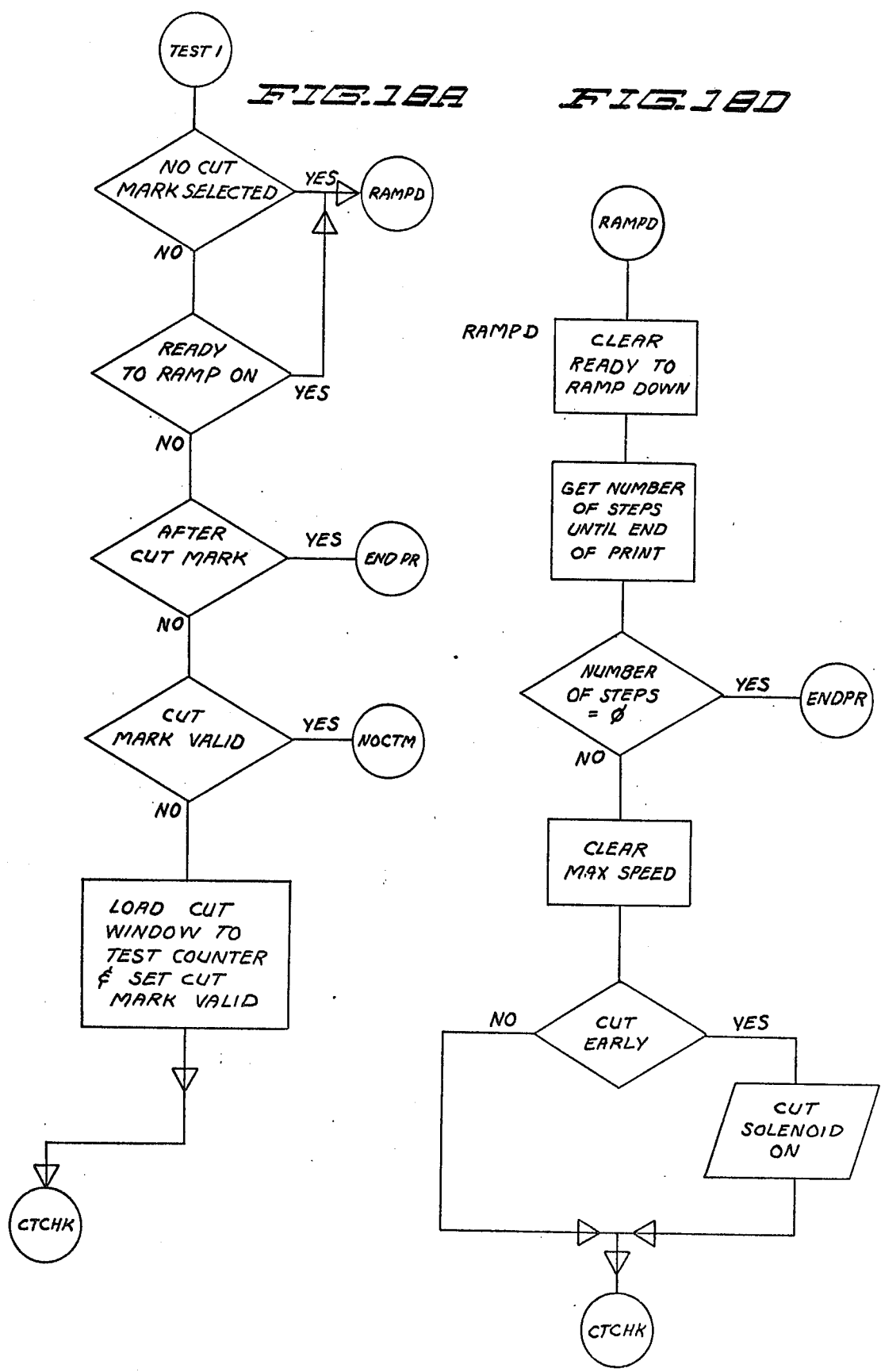

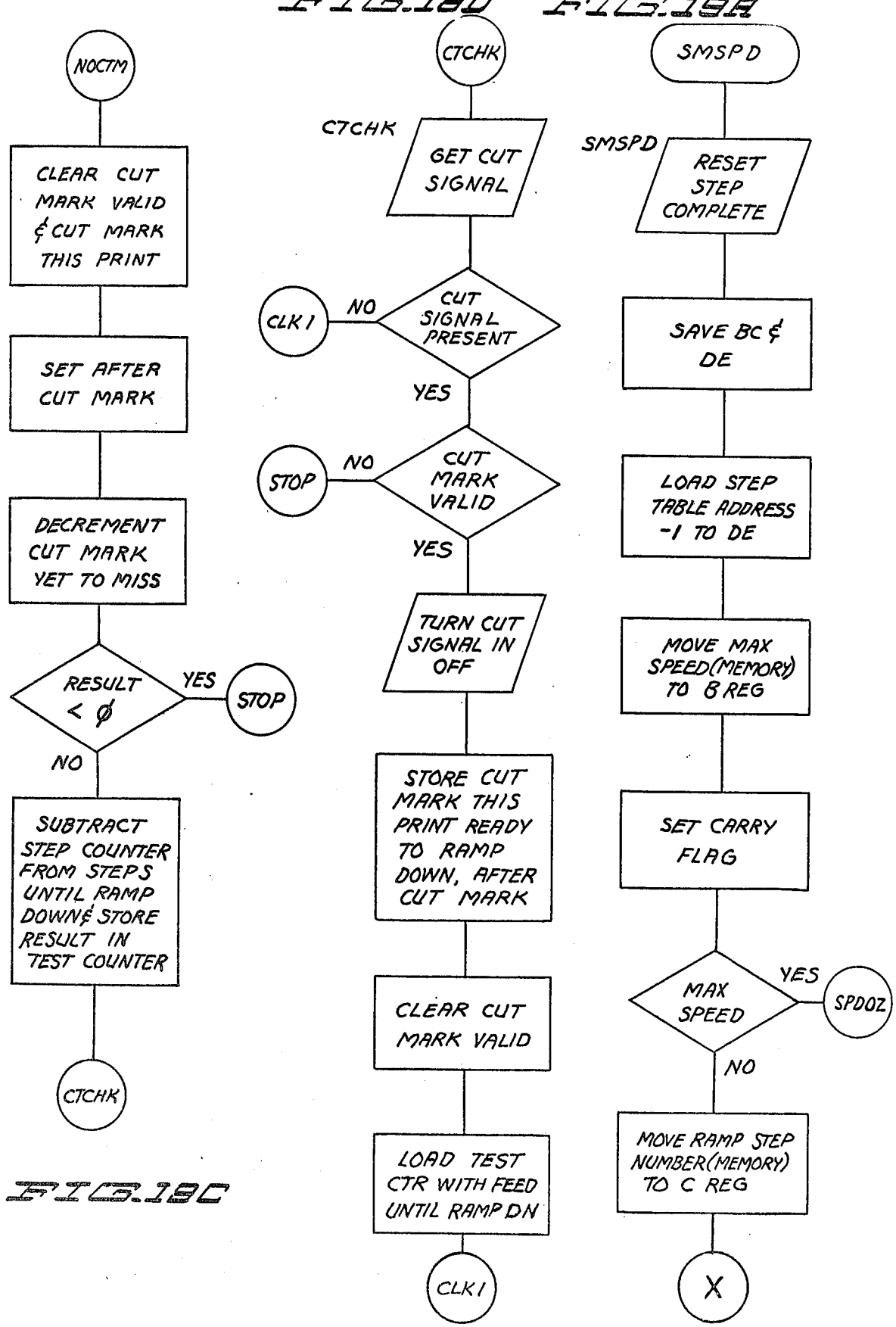

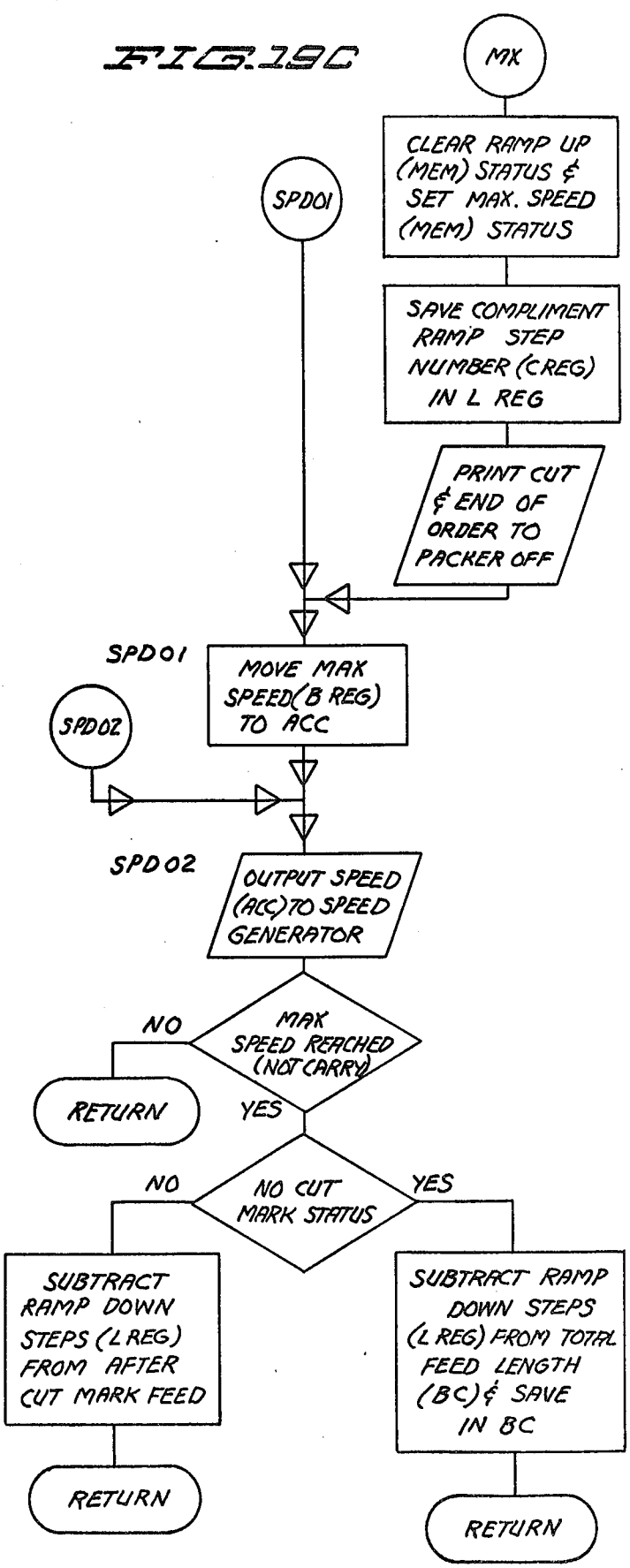
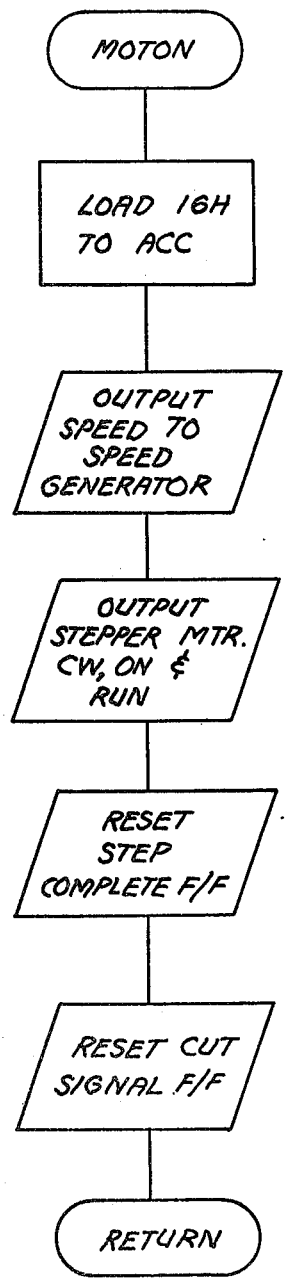
FIG. 19C
FIG. 20

STEPPER MOTOR CONTROL

REFERENCE TO CO-PENDING APPLICATIONS

Reference is made to the following co-pending patent applications which are filed on even date with this application and are assigned to the same assignee as this application: "Microprocessor Controlled Photographic Paper Cutter" Ser. No. 838,064 by G. Strunc and F. Laciak; "Paper Drive Mechanism for Automatic Photographic Paper Cutter" Ser. No. 837,987 by R. Diesch, now U.S. Pat. No. 4,106,716; "Multichannel Indicia Sensor for Automatic Photographic Paper Cutter" Ser. No. 837,986 by R. Diesch and G. Strunc; "Print and Order Totalizer for Automatic Photographic Paper Cutter" Ser. No. 837,065 by G. Strunc; "Paper Feed Control for Automatic Photographic Paper Cutter" Ser. No. 838,000 by R. Diesch and G. Strunc; "Photographic Paper Cutter with Automatic Paper Feed in the Event of Occasional Missing Cut Marks" Ser. No. 837,999 by G. Strunc and "Knife Assembly for Photographic Strip Cutter" Ser. No. 837,998, now U.S. Pat. No. 4,112,801 by R. Diesch. Subject matter disclosed but not claimed in the present application is disclosed and claimed in these co-pending applications.

BACKGROUND OF THE INVENTION

The present invention relates to stepper control systems. In particular, the present invention relates to stepper motor control systems in which a digital processor, such as a microprocessor, controls the speed of a stepper motor as a function of numbers stored in look-up tables.

A stepper motor is a motor which rotates or drives in incremental steps. The rate of rotation or speed of the stepper motor is determined by the frequency of drive signals to the stepper motor. Since the stepper motor is essentially digital in nature, it is particularly well suited for use with digital electronic systems. In addition, it provides highly accurate drive distances with the tolerance being determined by the incremental rotation produced by one stepper motor step. Stepper motors have found application, for example, in photographic paper cutters and film cutters, where highly accurate drive distances are required.

In many stepper motor systems, it is desirable to provide stepper motor drive signals which have an exponentially increasing frequency to the desired maximum drive frequency in order to accelerate the stepper motor. Similarly, an exponentially decreasing frequency from the maximum drive frequency is desirable in order to decelerate the stepper motor prior to stopping. In the past, devices which provide up and down ramp frequency signals for stepper motors have generally been analog in nature. As a result, they have been generally complex and relatively inaccurate.

In U.S. Pat. No. 4,042,973 by P. J. Caulfield et al, a closed loop feedback digital system is described which generates a square wave type signal of exponentially varying frequency. This system may be used to provide the up ramp (i.e. acceleration) and down ramp (i.e. deceleration) signals for a stepper motor. This system, however, is relatively specialized and limited in the frequency variations which can be produced. A system having greater flexibility is desirable.

SUMMARY OF THE INVENTION

The present invention is a stepper motor control system in which the operation of a stepper motor is controlled by processor means, which in a preferred embodiment is a microprocessor. Several tables of numbers are stored in "look-up tables". The processor means controls the speed of the stepper motor as a function of the numbers in the various tables.

In one embodiment, a first table stores numbers representative of various desired maximum of speeds for the stepper motor. A second table stores numbers in a sequence representing desired stepper motor speeds during an up ramp, and a third table stores numbers in a sequence representing desired stepper motor speeds during a down ramp. A speed select switch selects the desired maximum speed from the first table, and the processor means controls the operation of the stepper motor as a function of the selected number from the first table, together with the sequences of numbers from the second and third tables.

BRIEF DESCRIPTION OF THE DRAWINGS

FIG. 9 is an electrical schematic diagram of the packer interface shown in FIG. 4.

FIG. 11 is an electrical schematic diagram of the stepper motor phase generator shown in FIG. 4.

FIGS. 13–20 are flow charts illustrating the operation of the stepper motor control of the present invention.

DETAILED DESCRIPTION OF THE PREFERRED EMBODIMENTS

The stepper motor control system of the present invention uses a microprocessor to control the operation of a stepper motor. Up ramps in motor speed, down ramps in motor speed, and maximum speeds are stored in various numerical tables which are accessed by the microprocessor and are used to control the operation of the stepper motor. By changing the numbers stored in the tables, entirely different stepper motor operations can be achieved. This arrangement permits great flexibility, and allows the stepper motor control system to be used in a wide variety of applications.

The stepper motor control system of the present invention has been used to considerable advantage in an automatic paper cutter, which cuts photographic prints from a strip of photographic paper. The stepper motor drives the paper to a knife assembly, which cuts the paper. Extremely accurate and high speed paper feed must be provided in order to cut the prints at the desired rates, which may be as high as 25,000 prints per hour (i.e. over 7 prints per second). The stepper motor must accelerate the paper rapidly to a maximum speed and, in response to a signal from a cut mark sensor, slow down and stop the paper so that the paper is cut at precisely the correct location between adjacent prints. The stepper motor control system of the present invention has proved to be extremely useful in meeting these demanding requirements.

The stepper motor control system of the present invention, therefore, will be described in the context of an automatic photographic paper cutter. It will be apparent, however, that the stepper motor control system of the present invention may be used to advantage in a wide variety of other applications in which a stepper motor is required.

The following section, which is entitled "Paper Cutter System Overview", generally describes the operation of a high speed, microprocessor controlled, photographic paper cutter including the stepper motor control system of the present invention. A more detailed description of the entire electrical control system of the automatic paper cutter may be found in the previously mentioned co-pending patent application entitled "Microprocessor Controlled Photographic Paper Cutter" Ser. No. 838,064 by G. Strunc and F. Laciak, and a more detailed description of the paper supply and drive mechanism may be found in the previously mentioned application entitled "Paper Drive Mechanism for Automatic Photographic Paper Cutter" Ser. No. 837,987 by R. Diesch. The other co-pending patent applications referred to in the "Reference to Co-Pending Applications" also describe various aspects of the automatic photographic paper cutter shown in the Figures. For that reason, a detailed description of all of the various components of the automatic paper cutter will not be included in the present application.

Paper Cutter System Overview

Figure 1:
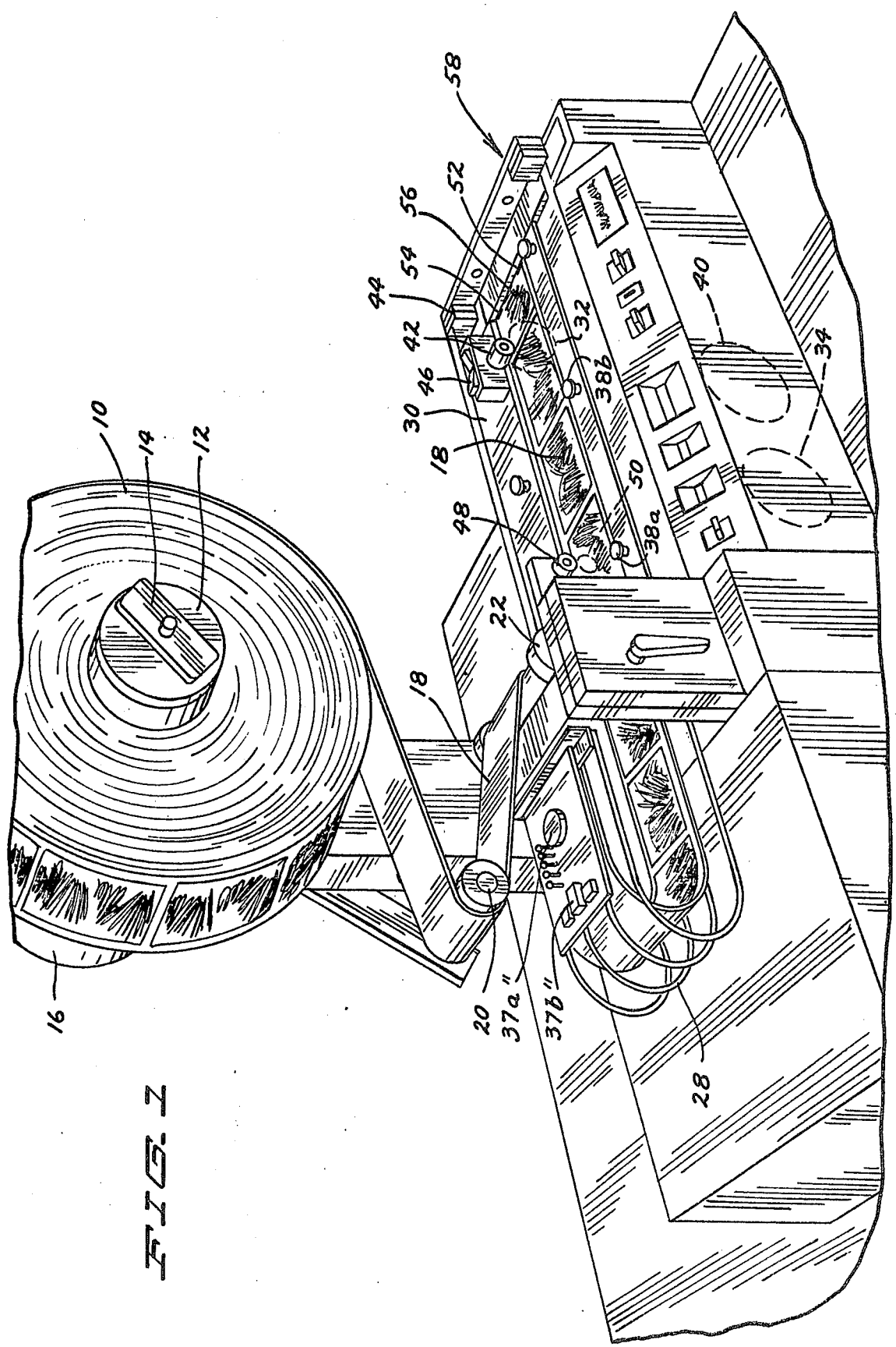
FIG. 1 is a perspective view of an automatic paper cutter utilizing the stepper motor control of the present invention.

FIG. 1 is a perspective view of a high speed, microprocessor controlled, automatic paper cutter which includes the stepper motor control system of the present invention. The paper cutter includes five major portions: a paper supply, a paper drive mechanism, a knife assembly, main and auxiliary control panels, and control electronics.

The paper supply is an integral part of the paper cutter. A paper roll 10 is loaded from the front on to hub 12, and a lever 14 is tightened to hold paper roll 10 in place. By tightening lever 14, an elastomer material is expanded to give a press fit on the inside diameter of the core of paper roll 10. The rotation of hub 12 is controlled by electro-mechanical brake 16.

Paper strip 18 from roll 10 is trained over bale arm assembly 20 and guide roller 22, between drive and idler pinch rollers (not shown), into wire form retainer 28, and then to paper guides 30 and 32 of the paper drive mechanism. The drive pinch roller is driven by the same AC motor 34 which drives the knife assembly of the paper cutter. The motor 34 drive is transmitted to the drive pinch roller through a belt drive and electromechanical clutch 36 (shown schematically in FIG. 4).

The paper drive mechanism includes paper guides 30 and 32, which receive paper strip 18 from the paper supply assembly. Rear guide 30 is fixed and front guide 32 is movable so that various paper widths can be accommodated. Front paper guide 32 is adjusted by loosening thumbscrews 38a and 38b and moving front guide 32 to the desired position.

Paper strip 18 is driven by stepper motor 40 through idler and drive pinch rollers 42 and 44. Idler roller 42 has a lever 46 to locate idler roller 42 in the engaged position for operation and in the disengaged position for loading paper, shipping, and other non-operating modes. Rollers 42 and 44 are located at the rear edge of strip 18 so that the entire print is visible to the operator. Additional guidance of paper strip 18 is provided by another set of idler rollers 48 and 50, which are located near the end of the paper cutter.

Front and rear indicia sensor assemblies 52 and 54 are mounted below top plate 56 and sense all types of marks which appear on the back side of paper strip 18. Cut marks sensed by front or rear sensor assemblies 52 or 54 are used to indicate the location of a desired paper cut.

Knife assembly 58 includes a base, spring-wrap clutch mechanism 60 (shown schematically in FIG. 4), AC motor 34 (which also drives the drive pinch roller of the paper supply), a main drive shaft, two crank arm assemblies, two vertical drive shafts, and interchangeable blades. One blade is used for cutting straight-bordered and straight-borderless prints, and the other blade is used for cutting round-cornered borderless prints.

Figure 2:
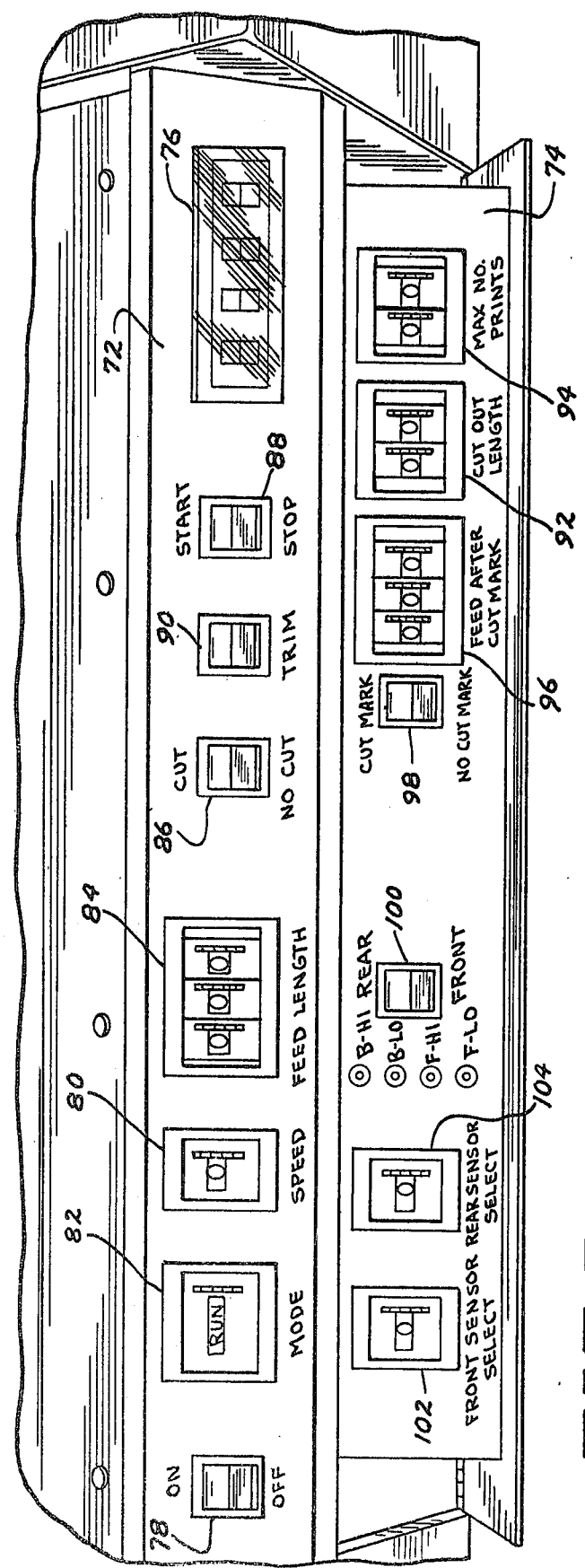
FIG. 2 shows the main and auxiliary control panels of the automatic paper cutter of FIG. 1.

FIG. 2 shows the main and auxiliary control panels 72 and 74. Main control panel 72, which is located at the front of the paper cutter, has a display 76 and seven switches. The seven switches are Power switch 78, Speed Select switch 80, Mode Select switch 82, Feed length switch 84, Cut/No Cut switch 86, Start/Stop switch 88, and Trim switch 90.

The remaining seven switches of the automatic paper cutter are located on auxiliary panel 74, which is located below main control panel 72 and is accessible through a hinged cover. The seven switches are Length of Cutout switch 92, Maximum Number of Prints switch 94, Feed-After-Cut Mark switch 96, Cut Mark-/No Cut Mark switch 98, Front/Rear Cut Sensor switch 100, Front Sensor Select switch 102, and Rear Sensor Select switch 104.

The automatic paper cutter operation is commenced by turning on Power switch 78. Front paper guide 32 is then set to the appropriate paper width, paper roll 10 is installed on hub 12, and paper strip 18 is threaded through the paper supply and into the paper cutter.

The operator then selects the proper sensor assembly (either front sensor 52 or rear sensor 54) to sense cut marks by switching Front/Rear Cut Sensor switch 100 to the "Front" or the "Rear" position. The sensor assembly which is not selected is automatically used to sense end-of-order marks, which appear along the opposite edge of paper strip 18 from the cut marks.

The next step involves selecting a proper segment of the sensor assembly so that the largest sensor signal is provided. Mode switch 82 is placed in the SENSOR SELECT mode, and a portion of print paper strip 18 bearing a cut mark or end-of-order mark is oscillated back and forth past the sensor assembly. The operator sets the Front and Rear Sensor Select switches 102 and 104 to the settings which select the proper segments of sensor assemblies 52 and 54 so that the largest sensor signals are provided.

Mode switch 82 is then set to the FEED LENGTH CALIBRATE mode, Start switch 88 is actuated and one print is fed from cut mark to cut mark. The feed length is displayed on display 76 and that value is set into Feed Length switch 84 by the operator.

The operator then sets Mode switch 82 to the FEED AFTER SENSE mode. The edge of a print is aligned with a calibration mark on one of the paper guides 30 and 32. Start switch 88 is actuated and the paper advances to the next cut mark and stops. The feed-after-sense length is displayed on display 76, and the operator sets that value into Feed-After-Sense switch 96.

The operator then sets Mode switch 82 to the RUN mode and sets Speed switch 80 to the desired cycle rate. If bordered or round-cornered borderless prints are being cut, the paper cutter is then ready to operate. If straight borderless prints are being cut, the length of cutout must be set in Length of Cutout switch 92.

Automatic operation of the paper cutter can then be commenced by actuating Start switch 88. At the end of a shift or the end of a day, summary modes are available in which the total prints cut and total orders cut during that shift or that day are displayed on display 76.

Stepper Motor Control System

Figure 3:
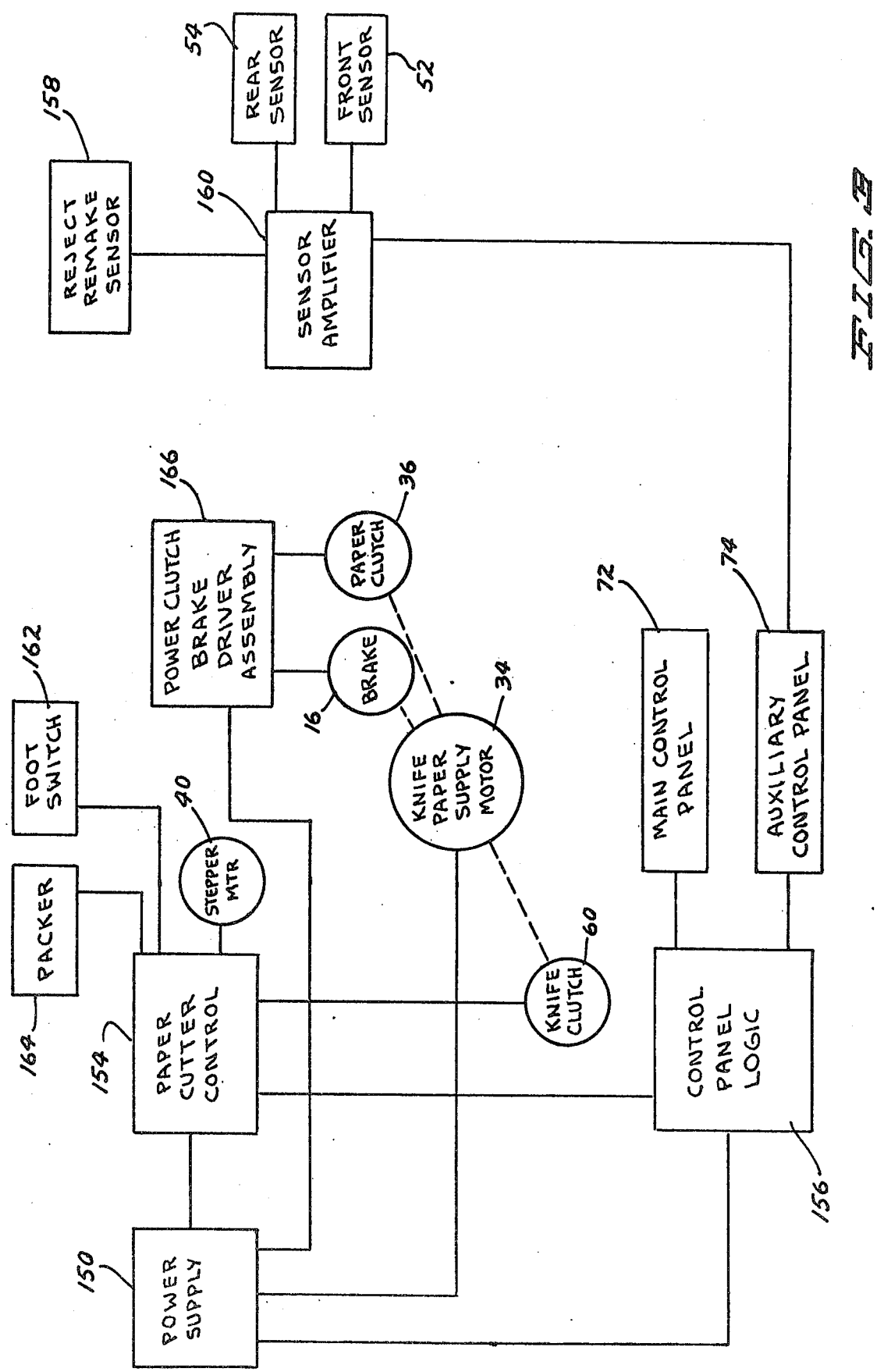
FIG. 3 is an electrical block diagram of the automatic paper cutter of FIG. 1.

FIG. 3 is an electrical block diagram of the automatic photographic paper cutter. As shown in FIG. 3, power supply 150 supplies power to the various circuits and motors contained in the paper cutter. Power supply 150 is controlled by Power switch 78.

Paper cutter control 154 controls the operation of the paper cutter. Paper cutter control 154 receives inputs from the various switches of main control panel 72 and auxiliary panel 74 through control panel logic circuit 156. In addition, signals from reject/remake sensor 158, front indicia sensor 52 and rear indicia sensor 54 are processed by sensor amplifier circuit 160 and supplied through auxiliary panel 74 and control panel logic 156 to paper cutter control 154. Paper cutter control 154 also may receive inputs from optional foot switch 162 and print packer 164. Foot switch 162 is connected in parallel with the start contacts of start/stop switch 88 of main control panel 72 and allows the operator to initiate a feed-and-cut cycle without the use of hands. Packer 164 may be a photographic print sorter and packer such as the PAKOMP II photopacker manufactured by PAKO Corporation. If the paper cutter is said to be used in conjunction with packer 164, interconnection is necessary in order to coordinate the operation of the two devices.

The outputs of paper cutter control 154 control the operation of stepper motor 40. Control of AC motor 34 is achieved by means of knife clutch 60, paper clutch/brake driver assembly 166, paper brake 16, and paper clutch 36. Paper cutter control 154 also supplies signals to control panel logic 156 which controls display 76 on the main control panel 72, and supplies output signals to packer 164 if the paper cutter is being used in conjunction with packer 164.

Figure 4:
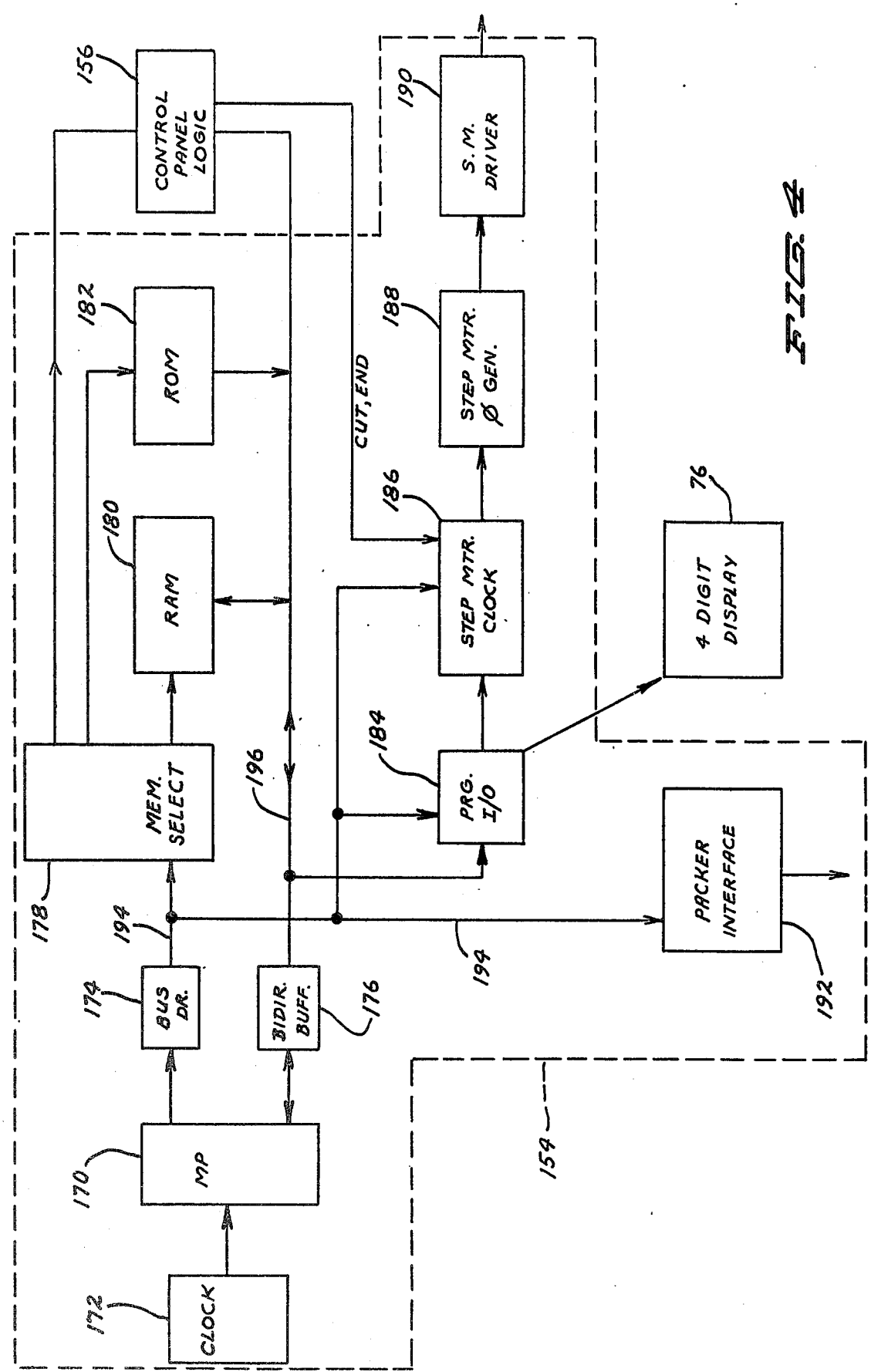
FIG. 4 is an electrical block diagram of the paper cutter control shown in FIG. 3.

FIG. 4 shows an electrical block diagram of paper cutter control 154. The paper cutter control includes microprocessor 170, clock 172, bus driver 174, bidirectional buffer 176, memory select circuit 178, random access memory (RAM) 180, read-only memory (ROM) 182, programmable input/output (I/O) device 184, stepper motor clock 186, stepper motor phase generator 188, stepper motor driver 190, and packer interface circuit 192.

In one preferred embodiment, microprocessor 170 is an 8-bit microprocessor such as the Intel 8080A. Clock circuit 172 supplies clock signals, together with some other related signals, to microprocessor 170. Bus driver 174 receives outputs from microprocessor 170 and drives various lines of address bus 194. Memory select circuit 178 receives the signals from address bus 194 and addresses selected locations of RAM 180 or ROM 182. In addition, memory select circuit 178 may address the control panel logic 156 shown in FIG. 3 to interrogate the various switches of main and auxiliary control panels 72 and 74. In the system shown in FIG. 4, the switches of main and auxiliary panels 72 and 74 are addressed in the same manner as a memory location. Data to and from RAM 180 and data from ROM 182 and control panel logic 156 is supplied over data bus 196. Bidirectional buffer 176 interconnects microprocessor 170 with data bus 196.

Programmable I/O device 184 is also connected to data bus 196 and receives data from microprocessor 170. This data is used to control operation of stepper motor 40 through stepper motor clock 186, stepper motor phase generator 188, and stepper motor driver 190. In addition to the output signals from programmable I/O device 184, stepper motor clock receives the CUT and END signals from control panel logic 156.

Programmable I/O device 184 also controls the operation of display 76. Depending upon the particular mode selected by mode switch 82 on main control panel 72, display 76 may display the feed length, the feed-after-sense length, the number of prints in the previous order, the total number of prints since the cutter was turned on, or the total number of orders since the cutter was turned on.

As shown in FIG. 4, packer interface circuit 192 is also connected to address bus 194. Packer interface circuit 192 supplies the necessary signals to packer 164 of FIG. 3 to coordinate the operation of packer 164 with the operation of the automatic paper cutter.

Figure 5:
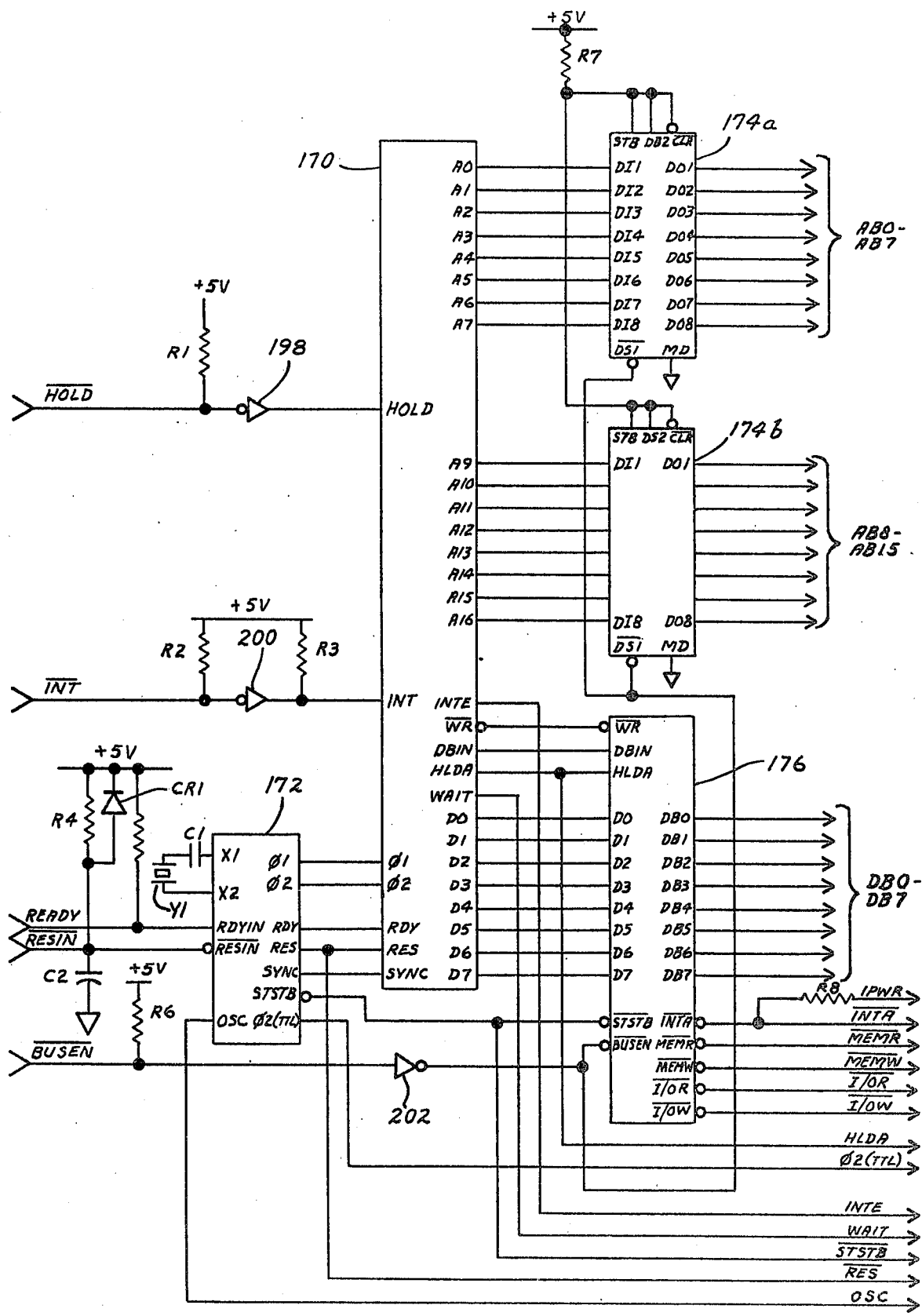
FIG. 5 is an electrical schematic diagram of a portion of the paper cutter control of FIG. 4 including a microprocessor, a clock, bus drivers, and a bidirectional buffer.
Figure 8:
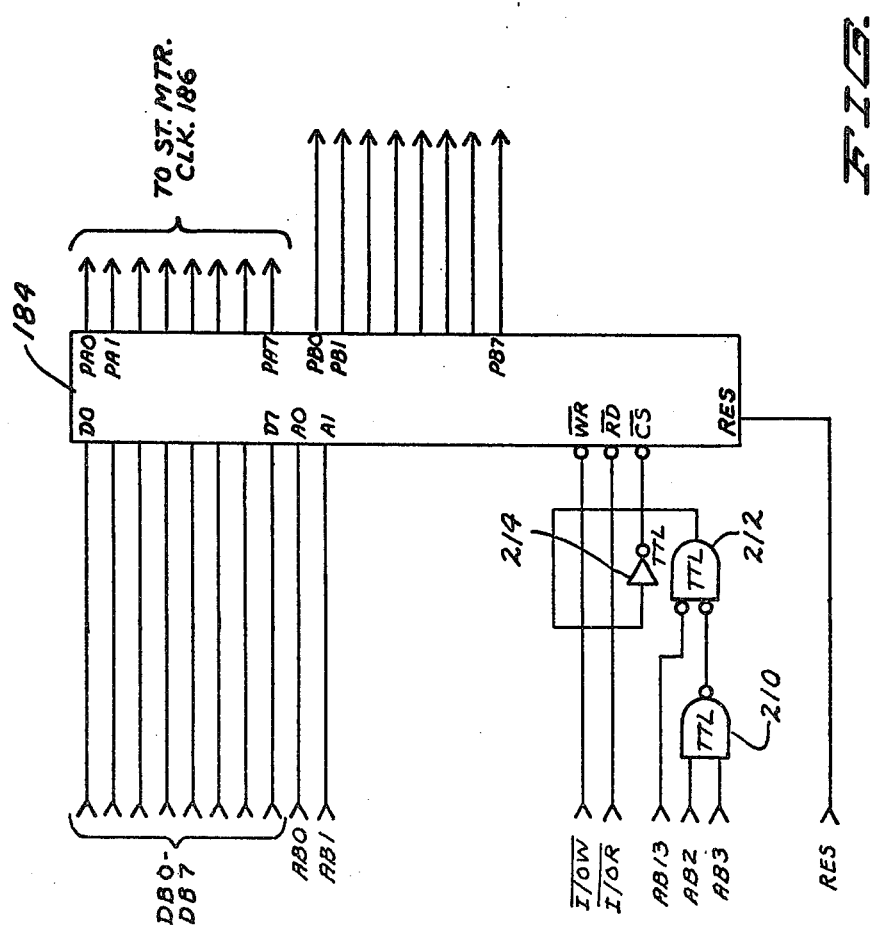
FIG. 8 is an electrical schematic diagram of the programmable input/output (I/O) device shown in FIG. 4.

FIG. 5 shows a portion of cutter control 154 including microprocessor 170, clock 172, bus drivers 174a and 174b, and bidirectional buffer 176. Also included in the circuit of FIG. 8 are resistors R1-R8, capacitors C1 and C2, diode CR1, and inverters 198, 200, 202, and 204.

Clock 172, which in one preferred embodiment is an Intel 8224 integrated circuit, provides the $\phi1$ and $\phi2$ clock signals to microprocessor 170. The frequency of the $\phi1$ and $\phi2$ clock signals is determined by oscillator crystal Y1 and capacitor C1. In one preferred embodiment, crystal Y1 is selected to provide an 18.432 Mhz oscillation.

In addition to the $\phi1$ and $\phi2$ clock signals, clock generator 172 also provides the RDY, RES, and SYNC signals to microprocessor 170, the $\overline{STSTB}$ signal to bidirectional buffer 176, and the $\phi2$ (TTL) and OSC signals to other circuits within cutter control 154.

In addition to the signals supplied by clock 172, microprocessor 170 receives the HOLD signal from inverter 198 and the interrupt (INT) signal from inverter 200. The outputs of microprocessor 170 includes address lines A0-A15, which form a 16 line address bus 194. Bus drivers 174a and 174b are enabled by the BUSEN signal from inverter 202.

Microprocessor 170 includes input/output ports D0-D7 are connected to bidirectional buffer 176, which also receives the $\overline{WR}$, $\overline{DBIN}$, and HLDA signals from microprocessor 170, the $\overline{STSTB}$ signal from clock 172, and the BUSEN signal from inverter 202.

Data lines DB0-DB7 of data bus 196 are connected to bidirectional buffer 176, which permits bidirectional flow of data on data bus 196 to and from microprocessor 170. In addition, bidirectional buffer 176 generates the $\overline{INTA}$, IPWR, $\overline{MEMR}$, $\overline{MEMW}$, I/OR, and $\overline{I/OW}$ signals which determine the direction of flow of data on data bus 196 and control the operation of the various circuits connected to data bus 196.

The remaining signals generated by the circuit shown in FIG. 5 are generated by microprocessor 170. These signals are the HLDA, INTE, and WAIT signals.

Figure 6:
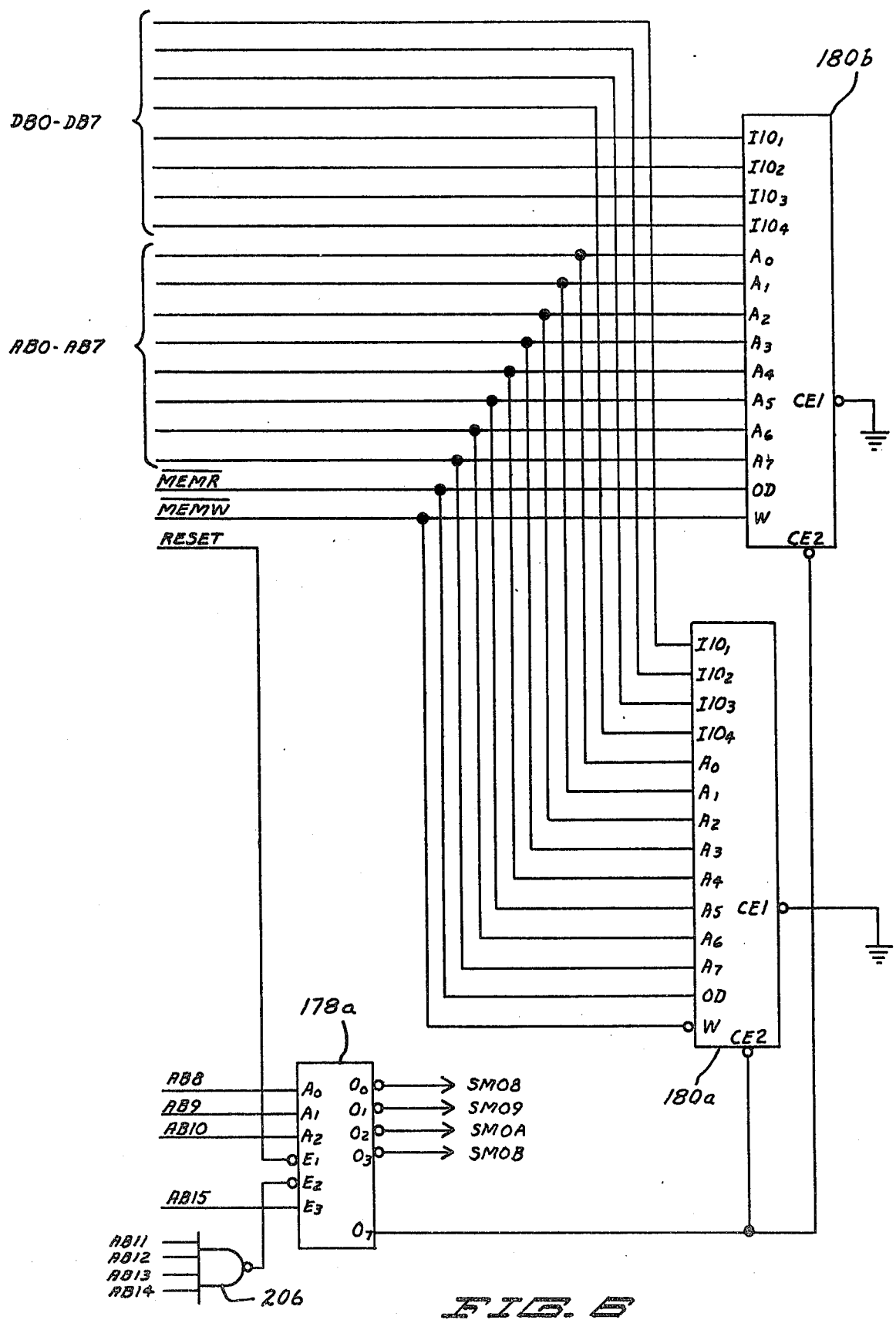
FIG. 6 is an electrical schematic diagram of a portion of the paper cutter control of FIG. 4 including random access memories and associated memory select circuitry.

FIG. 6 shows random access memories 180a and 180b, together with NAND gate 206 and memory select circuit 178a. In a preferred embodiment, random access memories 180a and 180b are Intel 8111-1 integrated circuits and memory select 178a is an Intel 8205 integrated circuit.

Depending upon the states of address bus lines AB-8-AB15, memory select 178a provides an enable signal to either RAM 180a or 180b, or will generate an enable signal on lines SMO8, SMO9, SMOA, or SMOB.

If either RAM 180a or RAM 180b is selected, data will either be written into or read from memory locations of the RAM. The state of the $\overline{MEMW}$ signal, which is supplied to the W inputs of RAM 180a and 180b determines whether data is written or read.

As shown in FIG. 6, the random access memory includes only two RAM integrated circuits 180a and 180b. If further storage is required, as many as six additional RAM integrated circuits may be connected and addressed by memory select 178a. In the embodiment of the automatic paper cutter described in the present application, however, two RAM integrated circuits is sufficient to provide the necessary storage.

Figure 7:
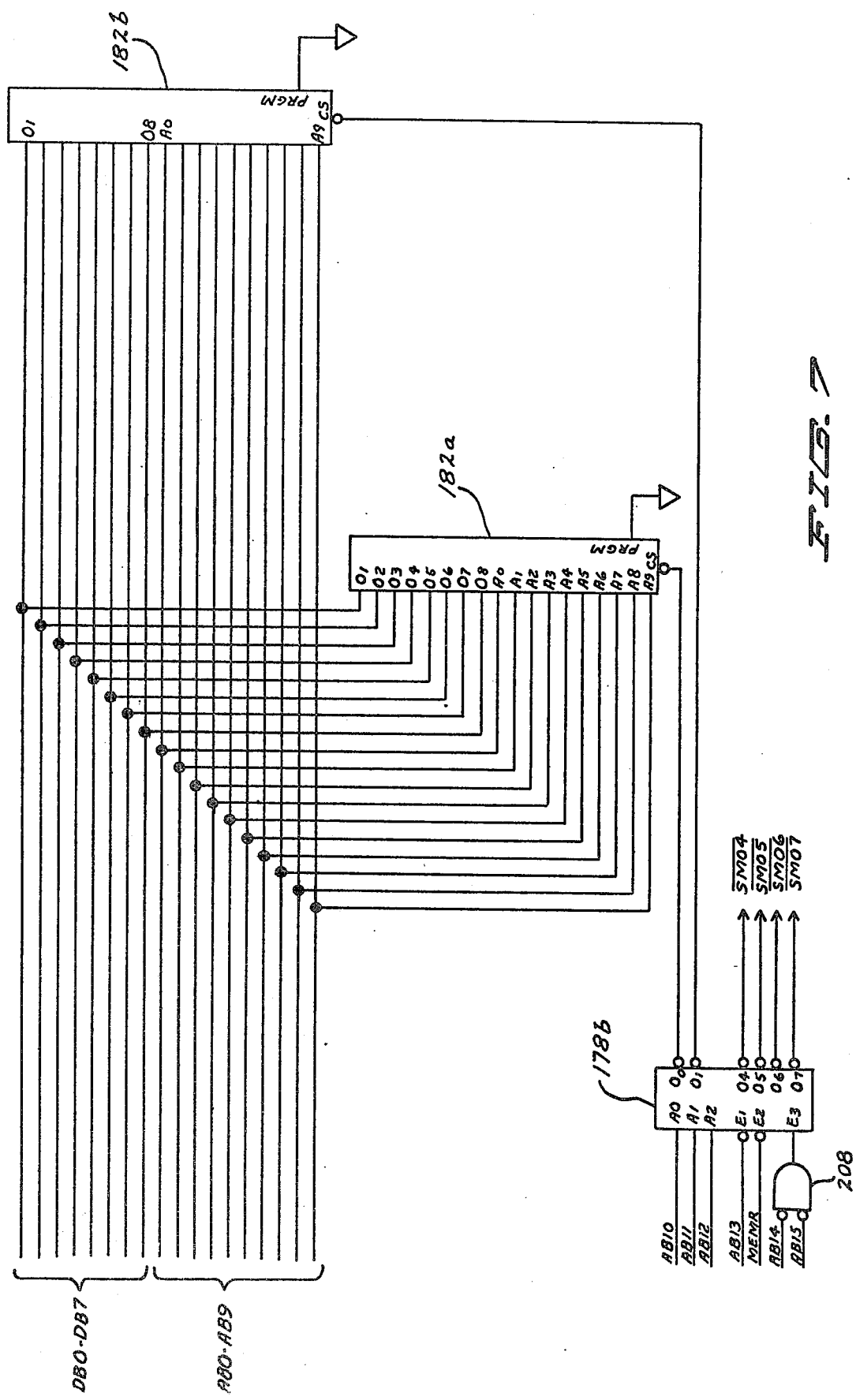
FIG. 7 is an electrical schematic diagram of a portion of the paper cutter control of FIG. 4 including read-only memories and associated memory select circuitry.

FIG. 7 shows ROMs 182a and 182b, memory select circuit 178b, and NAND gate 208. Memory select circuit 178b enables either ROM 182a or 182b depending upon the state of address bus lines AB10-AB15 and the $\overline{MEMR}$ signal. In addition, memory select circuit 178b produces the $\overline{SMO4-SMO7}$ signals.

In a preferred embodiment, ROMs 182a and 182b are erasable programmable read-only memories (EPROM) such as the Intel 8708. When either ROM 182a or 182b is enabled, address bus lines AB0-AB9 select the particular memory location, and data read from that location is supplied on data bus lines DB0-DB7.

As in the case of the random access memory shown in FIG. 6, the read-only memory of FIG. 7 may include additional memory circuits if additional storage is required. With the configuration shown in FIG. 7, two additional Intel 8708 EPROMs may be added without requiring additional memory select circuitry.

FIG. 8 shows programmable I/O device 184 together with NAND gates 210 and 212 and inverter 214. In a preferred embodiment, programmable I/O device 184 is an Intel 8255 integrated circuit and NAND gates 210 and 212 and inverter 214 are TTL logic gates. Except where otherwise specifically indicated, all logic gates shown in the Figures are CMOS integrated circuit devices.

Programmable I/O device 184 receives data bus lines DB0-DB7, address bus lines AB0 and AB1, and the $\overline{I/OW}$, $\overline{I/OR}$ and RES lines. In addition, address bus lines AB2 and AB3 are NANDed by NAND gate 210, whose output is NANDed with address bus line AB13 by NAND gate 212. The output of NAND gate 212 is inverted by inverter 214 and supplied to the $\overline{CS}$ input of programmable I/O device 184.

Programmable I/O device 184 has two 8-lines outputs. The first set of 8 outputs, which are designated PA0-PA7, are supplied to the inputs of stepper motor clock generator 186. The 8-bit number supplied on lines PA0-PA7 is used to control the frequency of the output of the stepper motor clock generator 186 and, therefore, the speed of stepper motor 40.

The PB0-PB7 outputs from programmable I/O device 184 are supplied to the main control panel 72. Lines PB0-PB7 are decoded and are used to drive display 76.

FIG. 9 shows circuitry which is primarily the packer interface 192 as shown in FIG. 4. This circuitry is used to provide the necessary signals to packer 164 shown in FIG. 3 in order to coordinate the operation of the automatic paper cutter with packer 164.

The interface circuitry of FIG. 9 includes an 8-bit adjustable latch 216, TTL NAND gates 218 and 220, and driver circuits 222, 224, 226, and 228 for producing the P SORT MARK+and−, ADVANCE COMPLETE+and−, END OF ORDER+and−, PRINT CUT+and−signals which are supplied to packer 164. In addition, FIG. 9 includes circuit 230 which receives the START+and−signals from packer 164 and supplies the START signal to control panel logic 156. Finally, FIG. 9 includes driver curcuit 232 which produces the CTSEG signal which energizes the cutter knife.

The A0, A1, and A2 inputs of latch 216 receive the AB8, AB9, and AB10 address bus lines. The D input of latch 216 is connected to AB11, the R input receives the $\overline{RES}$ signal, and the E input receives an enable signal which results from the NANDing of $\overline{I/OW}$, AB12, and AB14 by NAND gates 218 and 220.

The Q0 output of latch 216 is supplied through resistor R9 to stepper motor driver 190 as the OFF−signal. The Q1 output of latch 216 is the CTSON signal which is supplied to driver circuit 232. When the CTSON and LPP12 signals are high and the CUT signal is low, driver circuitry 232 provides the CTSEG signal which controls the operation of the cutter knife assembly.

Outputs Q2-Q5 of latch 216 are used to generate signals for packer 164. The Q2 output is supplied to driver circuit 222, which generates the P SORT MARK+and P SORT MARK−signals. Driver circuit 222 also receives the RRS signal from sensor amplifier 160. The RRS signal is high if reject/remake sensor 158 senses a mark on a print indicating that the print is a reject or a remake print.

The Q3 output of latch 216 is supplied to driver circuit 224, which provides the ADVANCE COMPLETE+and ADVANCE COMPLETE−signals to packer 164. Similarly, the Q4 output is supplied to driver circuit 226, and a Q5 output is supplied to driver circuit 228. Driver circuit 226 supplies the END OF ORDER+and END OF ORDER−signals to packer 164, while driver circuit 228 supplies the PRINT CUT+and PRINT CUT−signals to packer 164.

Circuit 230 shown in FIG. 9 receives the START+and START−signals from packer 164 and generates a START signal which is supplied to control panel logic 156. The START signal allows packer 164 to initiate a paper feed-and-cut cycle independent of start switch 88 on main control panel 72.

Figure 10A:
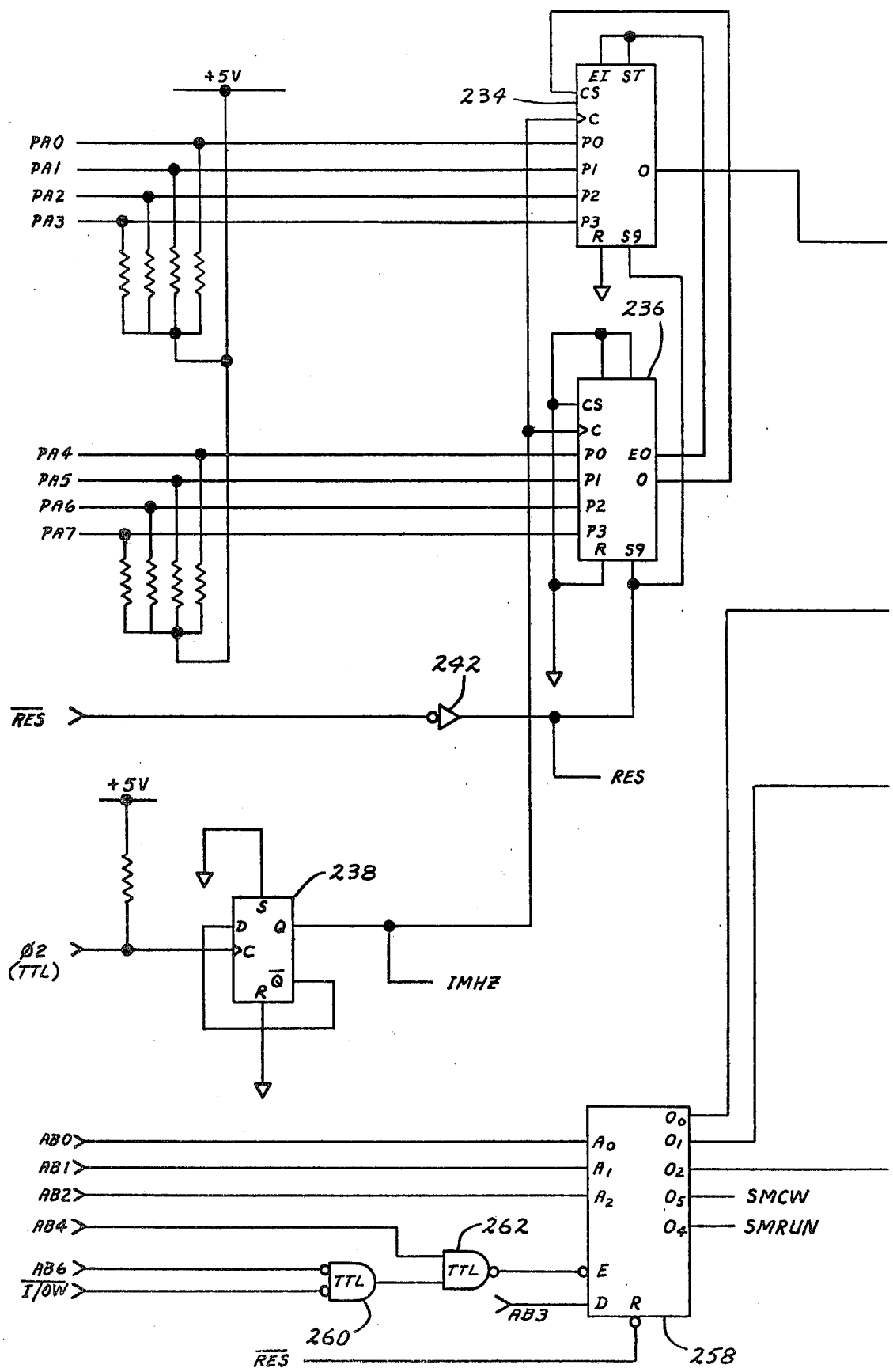
FIGS. 10A and 10B are electrical schematic diagrams of the stepper motor clock shown in FIG. 4.
Figure 10B:
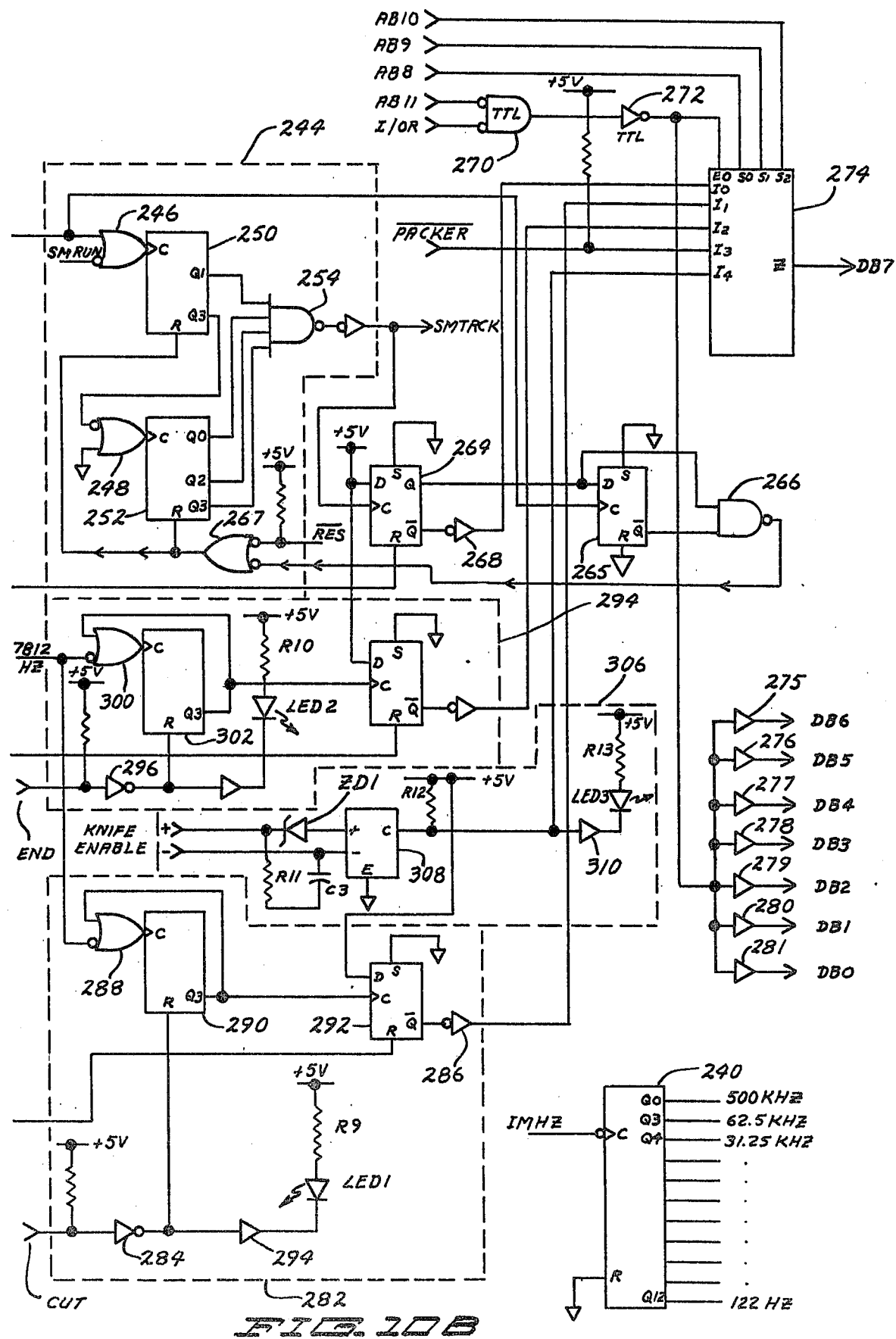
Figure 22:
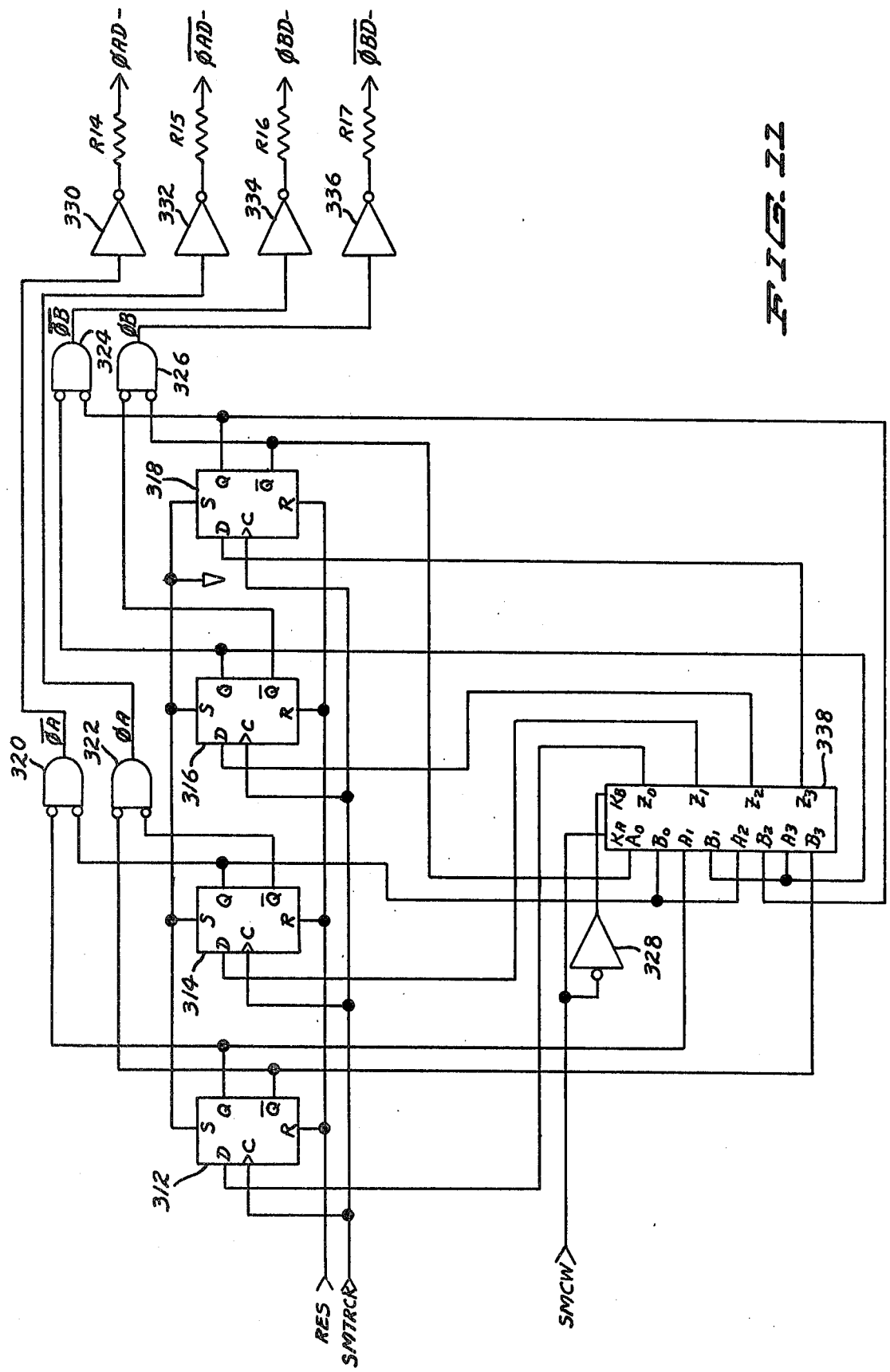

FIGS. 10A and 10B show stepper motor clock 186, which produces the SMTRCK and SMCW signals. The SMTRCK is a stepper motor clock signal, and each pulse of the SMTRCK signal corresponds to one step of stepper motor 40. The SMCW signal determines whether stepper motor will be driven clockwise or counter-clockwise. Both the SMTRCK and SMCW signals are provided to stepper motor phase generator 188.

The frequency of the SMTRCK signal is determined by inputs PA0–PA7, which are received from programmable I/O device 184. These inputs represent a two-digit binary coded decimal (BCD) number. Inputs PA0–PA3 represent the least significant bit, and PA4–PA7 represent the most significant bit. BCD rate multiplier 234 receives inputs PA0–PA3, and BCD rate multiplier 236 receives input PA4–PA7. The two-digit BCD numbers supplied to rate multipliers 234 and 236 represent the number of output pulses produced by the 0 output of rate multiplier 234 per one hundred clock pulses from flipflop 238. In the embodiment shown in FIGS. 10A and 10B, flipflop 238 receives the $\phi 2$ signal which has a frequency of 2 MHz from clock 172 and divides the frequency in half to produce a 1 MHz clock signal. In addition to supplying the 1 MHz signal to rate multipliers 234 and 236, flip-flop 238 also supplies the signal to the clock input of counter 240, which divides the frequency to generate other needed clock frequencies.

The $\overline{RES}$ signal, which is low when power is turned on, is inverted by TTL inverter 242. The RES signal, which is the output of inverter 242, is supplied to the S9 inputs of rate multipliers 234 and 236 to enable them.

The output of rate multiplier 234 is a pulse signal. The number of pulses per one hundred clock pulses is determined by the BCD number supplied on lines PA0–PA7. This number may vary from 0 to 99.

The output of rate multiplier 234 is supplied to a smoothing circuit 244 formed by OR gates 246 and 248, counters 250 and 252, NAND gate 254, and inverter buffer 256. The output of smoothing circuit 244 is the SMTRCK signal. The purpose of smoothing circuit 244 is to smooth variations in spacing between output pulses of rate multiplier 234. The SMTRCK signal is a signal whose spacing between pulses is relatively uniform for a given frequency and whose frequency is determined by the BCD inputs to rate multipliers 234 and 236.

It can be seen that stepper motor clock 186 shown in FIGS. 10A and 10B permits control of the frequency of the SMTRCK signal and, therefore, control of the speed of stepper motor 40 by microprocessor 170. The desired values for the BCD inputs to rate multipliers 234 and 236 are preferably stored in "lookup tables". These lookup tables contain numbers which control the maximum frequency of the SMTRCK signal, as well as a set of frequencies used to generate an up ramp in frequency at the beginning of stepper motor operation or a down ramp in frequency at the end of stepper motor operation.

The remaining circuitry shown in FIGS. 10A and 10B allows microprocessor 170 to monitor status of a number of important signals and to control generation of the SMTRCK as a function of the status of these signals. The first portion of this circuitry includes 8-bit adjustable latch 258, TTL NAND gates 260 and 262, flipflops 264 and 265, NAND gate 266, NOR gate 267, and inverter 268. Latch 258 is enabled when AB4 is high, AB6 and I/OW are low, and power is on so that the reset signal (RES) is low. The output states of latch 258 are determined by address bus lines AB0–AB3.

The $O_0$ and $O_4$ outputs of latch 258 directly control the production of the SMTRCK signal. The $O_4$ output is the SMRUN signal, which is supplied to the inverting input of OR gate 246 and which must be high for the SMTRCK signal pulses to be produced.

When a SMTRCK signal pulse is produced, it clocks flipflop 264 and causes the $\overline{Q}$ output of flipflop 264 to go low. This causes a high reset signal to be supplied to counters 250 and 252 by NOR gate 266. Further SMTRCK pulses are inhibited, therefore, until the $O_0$ output of latch 258 resets flipflop 264. The stepper motor clock, therefore, produces only one pulse at a time and microprocessor 170 must cause flipflop 264 to be reset before the next SMTRCK pulse (and therefore the next stepper motor step) is produced.

Microprocessor 170 periodically interrogates the status of flipflop 264, as well as the status of several other signals. This interrogation is achieved by TTL NAND gate 270, TTL inverter 272, 8-bit multiplexer 274, and buffers 275–281.

The state of the $I_0$ input to multiplexer 274 indicates the state of flipflop 264. This input, therefore, indicates whether a SMTRCK pulse has been produced and a step of the stepper motor has been taken.

The $I_1$ input to multiplexer 274 is received from the CUT signal status circuit 282, which includes inverters 284 andn 286, OR gate 288, counter 290, flipflop 292, and an indicator circuit formed by buffer 294, resistor R9, and light emitting diode LED1. Prior to receiving the CUT signal, which indicates that a cut mark has been sensed, the Q output of flipflop 292 is high and the $I_1$ input to multiplexer 274 is low. When the CUT signal goes high, the output of inverter 284 goes low, thereby removing the reset from counter 290 and causing LED1 to turn on. If the CUT signal remains high for the time required for counter 290 to count until its $Q_3$ output goes high, flipflop 292 will be clocked and the $\overline{Q}$ output will go low. A high input at the $I_1$ input to multiplexer 274, therefore, indicates a cut mark has been sensed. The $I_1$ input remains high until flipflop 292 is reset by the $O_2$ output of latch 258.

The $I_2$ input to multiplexer 274 is received from the END signal status circuit 294. END signal status circuit 294 is essentially identical to cut signal status circuit 282 and contains inverters 296 and 298, OR gate 300, counter 302, flipflop 304, and an indicator circuit including buffer 306, resistor R10, and LED2. The $I_2$ input to multiplexer 274 is low until the END signal goes high, at which time input $I_2$ goes high. It remains high until flipflop 304 is reset by the $O_1$ output of latch 258.

The $I_3$ input to multiplexer 274 is the $\overline{PACKER}$ signal. This signal indicates whether the automatic paper cutter is being operated in conjunction with a photo packer.

The $I_4$ input to multiplexer 274 is received from KNIFE ENABLE status circuit 306, which includes resistors R11 and R12, capacitor C3, Zener diode ZD1, optoisolator 308, and an indicator circuit formed by buffer 310, LED3, and resistor R13. KNIFE ENABLE status circuit 306 receives the KNIFE ENABLE+and−signals from packer 164. The $I_4$ input to multiplexer 274 is high when the KNIFE ENABLE+and−signals from packer 164 call for enabling of the paper cutter knife assembly.

Microprocessor 170 interrogates multiplexer 274 when the AB11 and $\overline{I/OR}$ signals are low. This causes multiplexer 274 to be enabled and also causes the outputs of buffers 275–281, which are connected to data bus lines DB0–DB6, to be low. Only DB7, which is the output of the multiplexer 274, supplies data to microprocessor 170. Address lines AB8–AB10 select the particular input of multiplexer 274 which is connected to DB7.

Stepper motor phase generator circuit 188 receives the SMTRCK and SMCW signals from stepper motor clock 186 of FIGS. 10A and 10B. Stepper motor phase signals are generated in response to the SMTRCK signal and supplied to stepper motor driver 190. Each pulse of the SMTRCK results in one step of stepper motor 40. The SMCW signal determines the direction of the stepper motor steps by controlling the phase relationship of the stepper motor phase signals produced by stepper motor phase generator circuit 188.

FIG. 11 shows stepper motor phase generator circuit 188, which includes flipflops 312, 314, 316, and 318; NAND gates 320, 322, 324, and 326; inverters 328, 330, 332, 334, and 336; resistors R14–R17; and quad 2-bit multiplexer 338. The stepper motor phase generator circuit receives the SMTRCK, SMCW, and RES signals and supplies the $\phi AD-$, $\overline{\phi AD}-$, $\phi BD-$, and $\overline{\phi BD}-$ signals to stepper motor driver 190.

The stepper motor phase generator circuit shown in FIG. 11 is a half-step phase generator, which provides greater accuracy in stepper motor operation at the expense of some torque. The $\phi AD-$, $\overline{\phi AD}-$, $\phi BD-$, and $\overline{\phi BD}-$ signals are generated in response to the SMTRCK signal from stepper motor clock 186. The phase relationship of these signals determines the direction in which the stepper motor steps. This phase relationship is controlled by the SMCW signal, which is supplied to quad 2-bit multiplexer 338. The outputs of quad 2-bit multiplexer 338 are supplied to the D inputs of flipflops 312, 314, 316, and 318.

Figure 12:
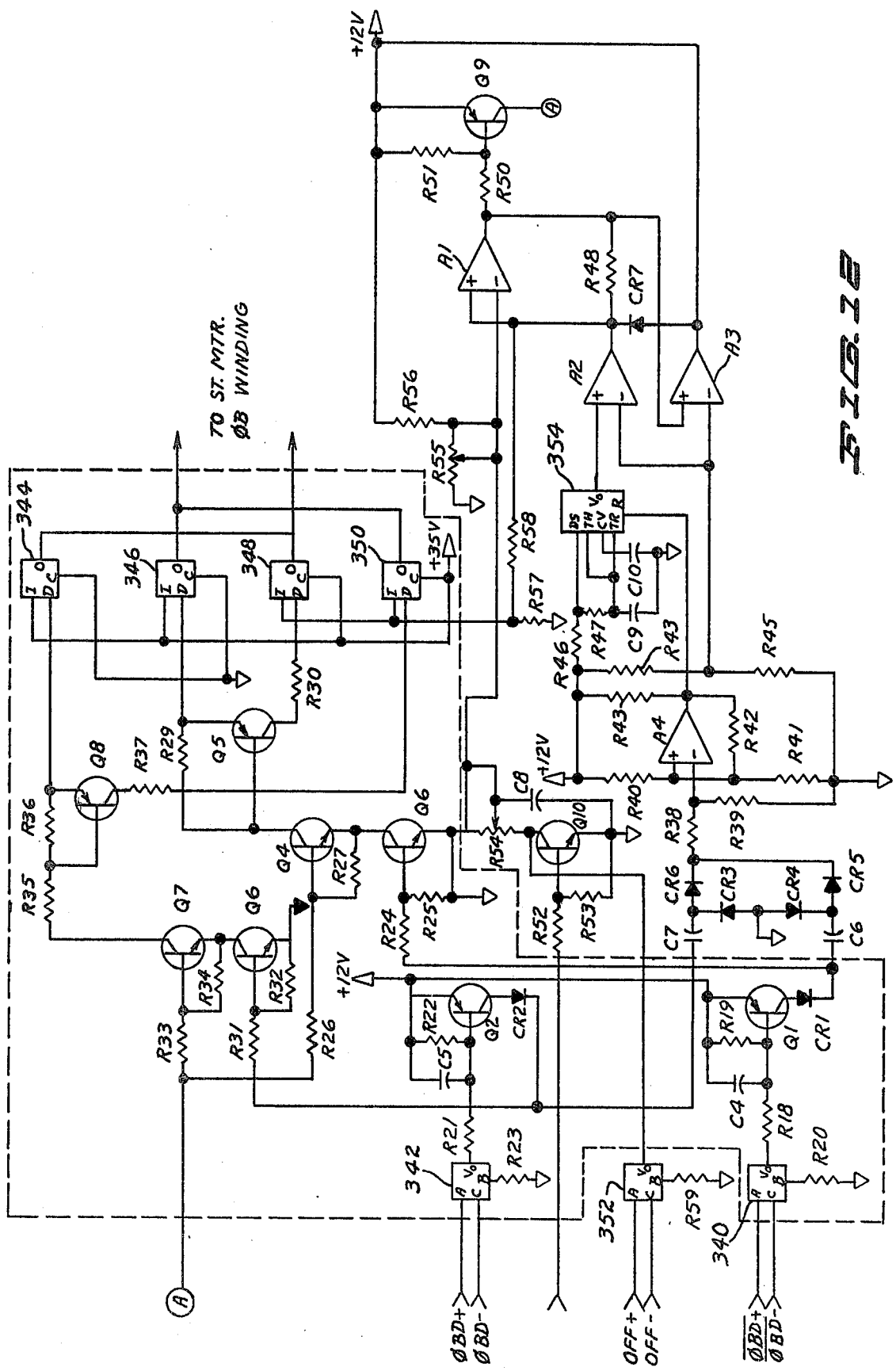
FIG. 12 is an electrical schematic diagram of a portion of the stepper motor driver shown in FIG. 4.

FIG. 12 is a schematic diagram of the portion of the stepper motor driver 190 which receives the $\phi BD-$, and $\overline{\phi BD}-$ and OFF— signals. This portion of stepper motor driver 190 controls the $\phi B$ windings of stepper motor 40. An identical circuit receives the $\phi AD-$, $\overline{\phi AD}-$ and OFF— and controls the $\phi A$ windings of stepper motor 40.

The stepper motor driver circuit shown in FIG. 12 includes two major parts. The first part is driver circuitry which generates the $\phi BM1$ and $\phi BM2$ signals. The second part controls the current levels supplied to the stepper motor winding to prevent the $\phi BM1$ and $\phi BM2$ signals from supplying excessive current. The first part of the circuit includes optoisolators 340 and 342; transistors Q1–Q8; resistors R18–R37; capacitors C4 and C5; diodes CR1 and CR2; and coil drivers 344, 346, 348, and 350.

The second part of the circuit includes optoisolator 352; transistors Q9 and Q10; comparators A1–A4; oscillator 354; diodes CR3–CR7; capacitors C6–C10; and resistors R38–R59. The output of the second part of the circuit is derived from the collector of transistor Q9 and is supplied to the bases of transistors Q5 and Q6 of the first part of the circuit.

As shown in FIG. 12, the $\phi BD+$ and $\overline{\phi BD}+$ signals are maintained at a constant voltage of +5 volts. The outputs of optoisolators 340 and 342, therefore, are controlled by the $\phi BD-$ and $\overline{\phi BD}-$ signals. When the $\overline{\phi BD}-$ signal goes high, the output of optoisolator 340 goes low, thereby turning on transistor Q1. As the same time the $\phi BD-$ signal goes low, thereby causing output of optoisolator 342 to go high and turning transistor Q2 off.

When transistor Q1 turns on, it supplies current through diode CR1 to the base of transistor Q3. Because transistor Q4 is also turned on, the signal to the base of transistor Q3 will turn it on, which turns transistor Q5 on. At the same time, since transistor Q2 is turned off, transistors Q6 and Q8 are turned off.

Transistors Q5 and Q8 control the signals at the D inputs of drivers 344, 346, 348, and 350. The outputs of drivers 344, 346, 348, and 350 are connected to provide the $\phi BM1$ and $\phi BM2$ signals to the $\phi B$ windings of stepper motor 40.

The second part of the circuitry shown in FIG. 12 controls the amount of current supplied to the stepper motor windings. This control is provided through transistors Q4 and Q7. When these transistors are turned off, no current may be supplied to the stepper motor windings.

Transistors Q4 and Q7 are controlled by the signal at the collector of transistor Q9. When transistor Q9 is turned on, transistors Q4 and Q7 are turned on. Conversely, when transistor Q9 is turned off, transistors Q4 and Q7 are turned off.

Transistor Q9 is controlled by the output of comparator A1. The non-inverting input of comparator A1 receives a signal from resistors R57 and R58 which is indicative of the current being supplied to the stepper motor windings. The inverting input of comparator A1 receives a reference signal which is controlled by a run current adjust circuit formed by resistor R55 and potentiometer R56 and a hold current adjust circuit formed by optoisolator 352; resistors R52, R53, and R59; potentiometer R54; transistor Q10; and capacitor C8. Whenever the signal at the noninverting input of comparator A1 exceeds the reference signal at the inverting input, the output of the comparator A1 goes high, and transistor Q9 turns off. This provides a current limiting function.

The outputs of comparators A2 and A3 are also connected to the noninverting input of comparator A1. The output of comparator A2 is directly connected to the noninverting input, while the output of comparator A3 is connected through diode CR7 to the noninverting input.

The output state of comparator A2 is controlled by oscillator 354, which in a preferred embodiment is a 20 KHz oscillator. Oscillator 354 has its reset input connected to the output of comparator A4. When the output of comparator A4 is high, oscillator 354 is inhibited from oscillating. Conversely, when the output of comparator A4 is low, the reset is moved from oscillator 354, and oscillator 354 is allowed to oscillate.

The noninverting input to comparator A4 is a reference voltage established by resistors R40 and R41. The inverting input to comparator A4 receives a signal which is controlled by the transistors Q1 and Q2. Comparator A4, therefore, senses a phase change when $\phi BD-$ and $\overline{\phi BD}-$ change state because the input voltage at the inverting input is less than the reference voltage at the noninverting input at the time of a phase change. The output of comparator A4 will be high, thereby holding the output of oscillator 354 in a low state. The outputs of comparators A1, A2, and A3, therefore, will all be low, and transistor Q9 will be turned on.

When the voltage at the inverting input of comparator A4 exceeds the reference voltage, oscillator 354 is enabled, and transistor Q9 is turned off and on at the oscillator frequency. The total current supplied to the φB stepper motor winding, therefore, is limited to a predetermined amount.

Stepper Motor Control—Operation

In the stepper motor control system of the present invention, microprocessor 170 controls the operation of stepper motor 40. Up ramps and down ramps in stepper motor speed are provided for each of a number of different maximum speeds.

The maximum stepper motor speeds are stored as numbers in a first lookup table. Each number is associated with one of the settings of speed select switch 80. Depending upon the setting of speed select switch 80, one of the numbers from the first lookup table is supplied to microprocessor 170.

A second lookup table stores a sequence of numbers which represent desired stepper motor speeds during an up ramp or down ramp. In a preferred embodiment, the same lookup table and sequence of numbers may be used for both the up ramp and the down ramp by merely reversing the order in which the numbers of the sequence are retrieved by microprocessor 170 from the lookup table.

The control of stepper motor speed is achieved by microprocessor 170 supplying numbers from the first or second lookup tables to programmable I/O device 184. Upon instruction by microprocessor 170, programmable I/O device 184 supplies a number to stepper motor clock 186. As shown in FIGS. 10A and 10B, stepper motor clockk 186 includes multipliers 234 and 236 which provide an output signal at a rate controlled by the number supplied by programmable I/O device 184. Specifically, the two-digit BCD number supplied by programmable I/O device 184 to rate multipliers 234 and 236 represents the number of output pulses supplied per 100 clock pulses from flipflop 238. The output of rate multiplier 234 is then supplied to a smoothing circuit 244 which smoothes out variations in spacing of the output pulses. The output of smoothing circuit 244 is the SMTRCK signal. Each pulse of the SMTRCK signal results in one step of stepper motor 40.

In the present invention, therefore, the frequency of the SMTRCK signal is controlled by microprocessor 170 by means of the numbers stored in the lookup tables. Selection of the numbers in the lookup tables allows a designer great flexibility in the design of a stepper motor control system.

It should be noted that the stepper motor control system of the present invention is an open loop frequency control, in that microprocessor 170 does not sense the frequency of the SMTRCK signal and vary the frequency accordingly. Instead, the present invention permits simulated closed loop control.

In a preferred embodiment of the present invention, the numbers stored in the first and second lookup tables have been derived from measurements of stepper motor frequencies using a closed loop stepper motor frequency control. The numbers stored in the lookup tables are selected to simulate the frequencies generated by the closed loop frequency control system.

The stepper motor control system in the present invention, therefore, is ideally suited for systems including a stepper motor. It takes advantage of the digital nature of the stepper motor and the great flexibility of a microprocessor. Depending upon the particular needs and requirements of the system, the speed control of the stepper motor may be modified by changing the numbers stored in the lookup tables associated with the microprocessor. This design freedom is highly desirable.

In order to illustrate the detailed operation of the stepper motor control system shown in the preceding figures, the operation of microprocessor 170 in one preferred embodiment of the present invention is illustrated by the flow charts shown in FIGS. 13–20. In addition, assembler listings associated with the flow charts shown in FIGS. 13–20, are shown in Table 1.

It should be noted that the flow charts and listings shown in this patent application represent only those portions of the operation of microprocessor 170 which are directly related to the stepper motor control of the present invention. It is clear from the preceding discussion that microprocessor 170 controls other functions of the automatic photographic paper cutter in addition to the stepper motor control function. Since these functions are not related to the present invention, they have been omitted. For a more complete description of the operation of microprocessor 170 in the automatic photographic paper cutter, reference should be made to the previously mentioned copending application entitled "Microprocessor Controlled Photographic Paper Cutter."

FIG. 13 illustrates the INIT routine. This routine is for initial start up and for interrupts. The initial conditions of the control system are initialized by this routine.

Figure 14B:
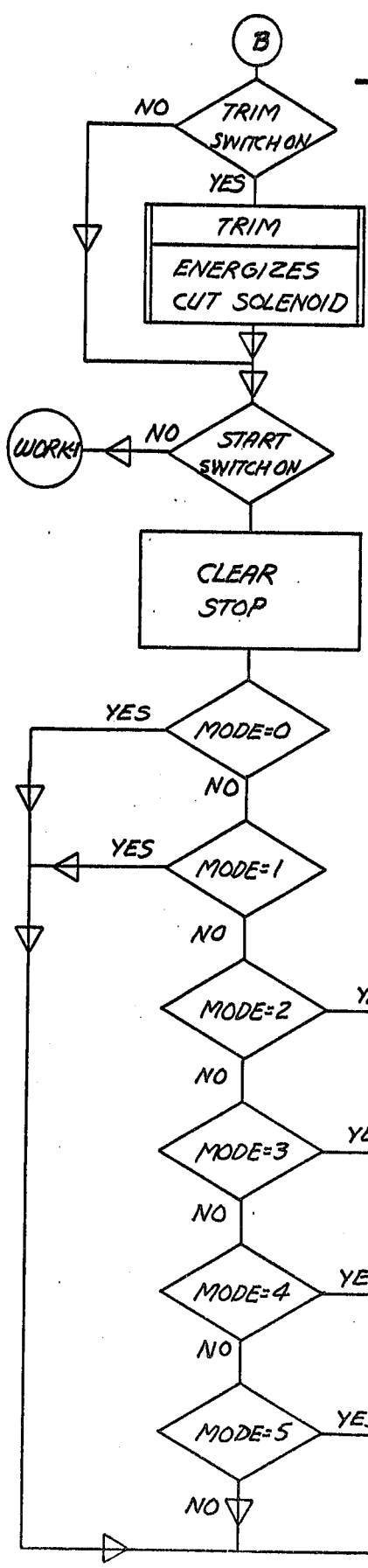

The next routine of microprocessor 170 is WORK. This routine reads the states of the various switches on main and auxiliary panels 72 and 74 and stores this information in appropriate locations of random access memory 180. FIGS. 14A and 14B are flow charts showing the WORK routine. It should be noted that certain sub-routines are shown or referred to in FIGS. 14A and 14B, and in Table 1, but are not described in detail in this patent application since they are not of direct bearing to the stepper motor control of the present invention. Examples are the DEBON and TRIM routines, as well as the routines associated with modes 2–5 which may be selected by mode switch 82. These other modes are the subjects of other co-pending applications described in the "Reference to Co-Pending Applications" and will not be discussed in the present application.

Figure 15:
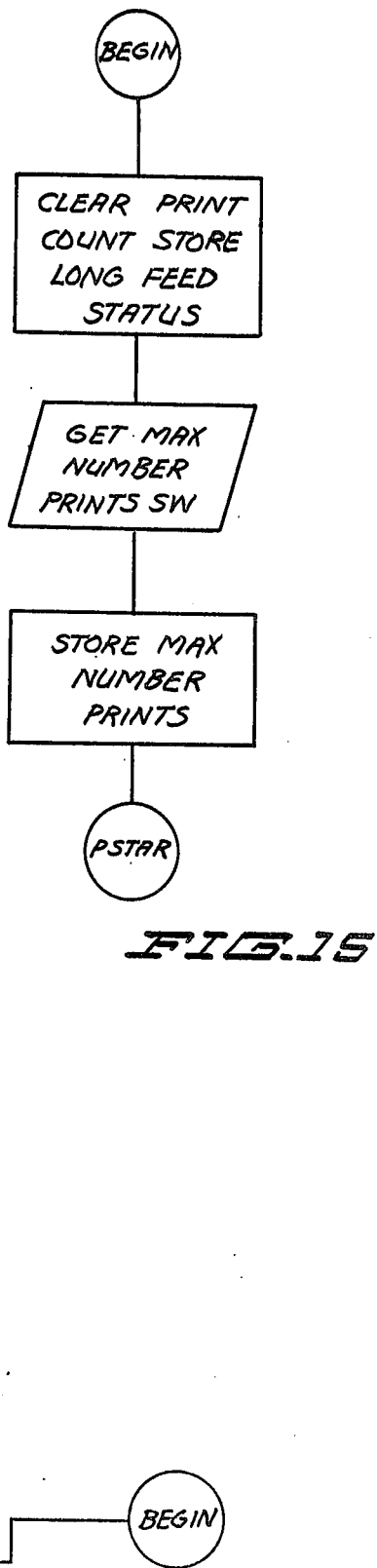

The next routine is the BEGIN routine. This routine is performed when the cutter is beginning an order. FIG. 15 illustrates the BEGIN routine.

Figure 16A:
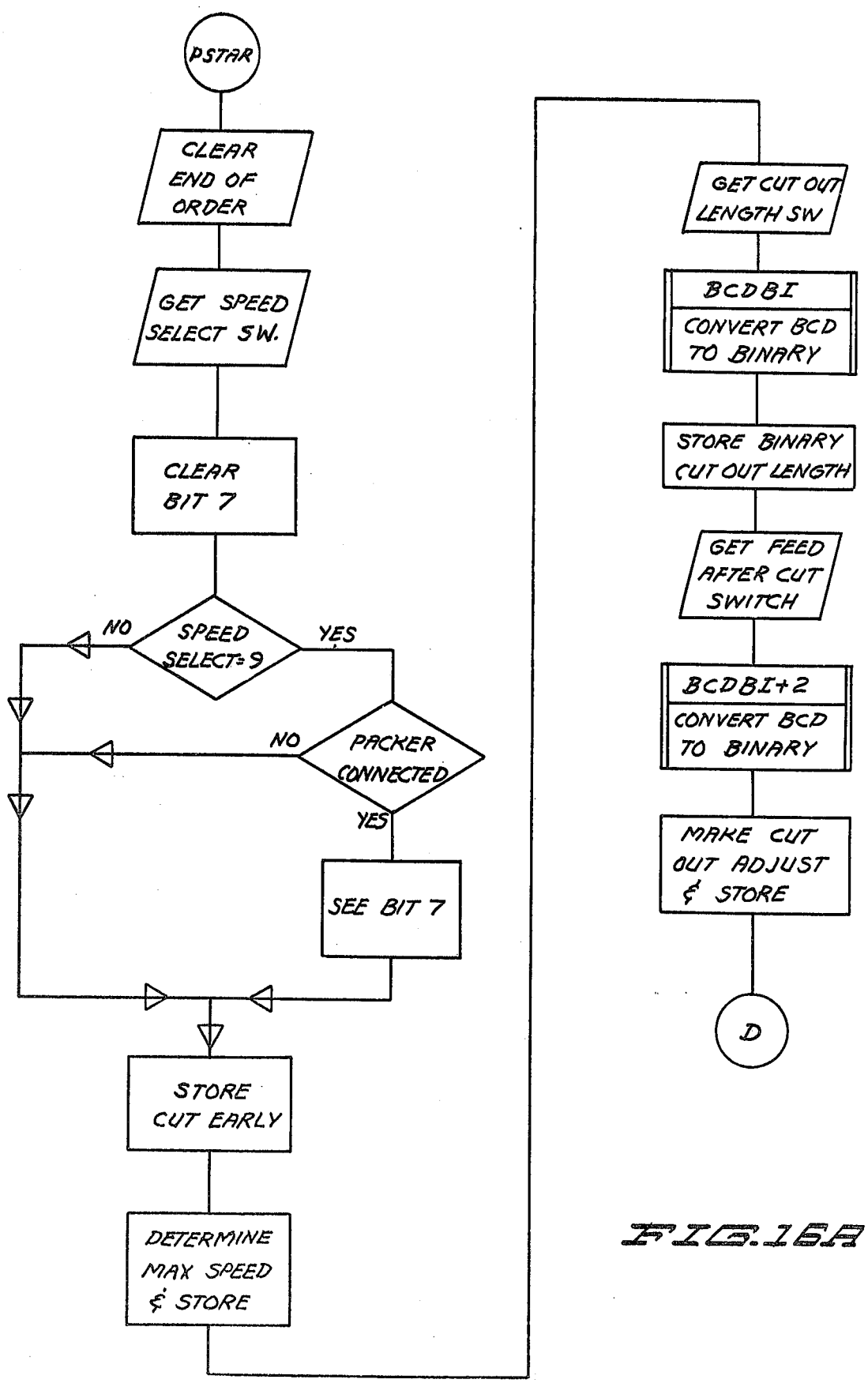

The next routine is the PSTAR routine illustrated in FIGS. 16A and 16B. The PSTAR routine is a print start routine and either follows the BEGIN routine if the cutter is beginning to cut prints from a new customer order or is commenced at the end of a feed-and-cut cycle where prints from the same customer order have already been cut.

During the PSTAR routine, the state of speed select switch 80 is interrogated and the maximum speed is determined and stored. The particular maximum speed is derived from the setting of speed select switch 80 and the particular number in the first lookup table which is associated with that speed select switch setting.

As shown in FIG. 16A, if the highest speed is selected, the PSTAR routine stores an indication that the knife assembly should be energized early so that there is minimal delay time between the stopping of the print paper and the cutting of the paper by the knife.

The PSTAR routine also includes steps which are necessary to determine the proper feed length depending upon whether the cut marks will or will not be sensed. This involves a conversion of the BCD stored information contained in the feed length switch 84, cut-out length switch 92, and feed-after-cut mark switch 96.

Figure 17B:
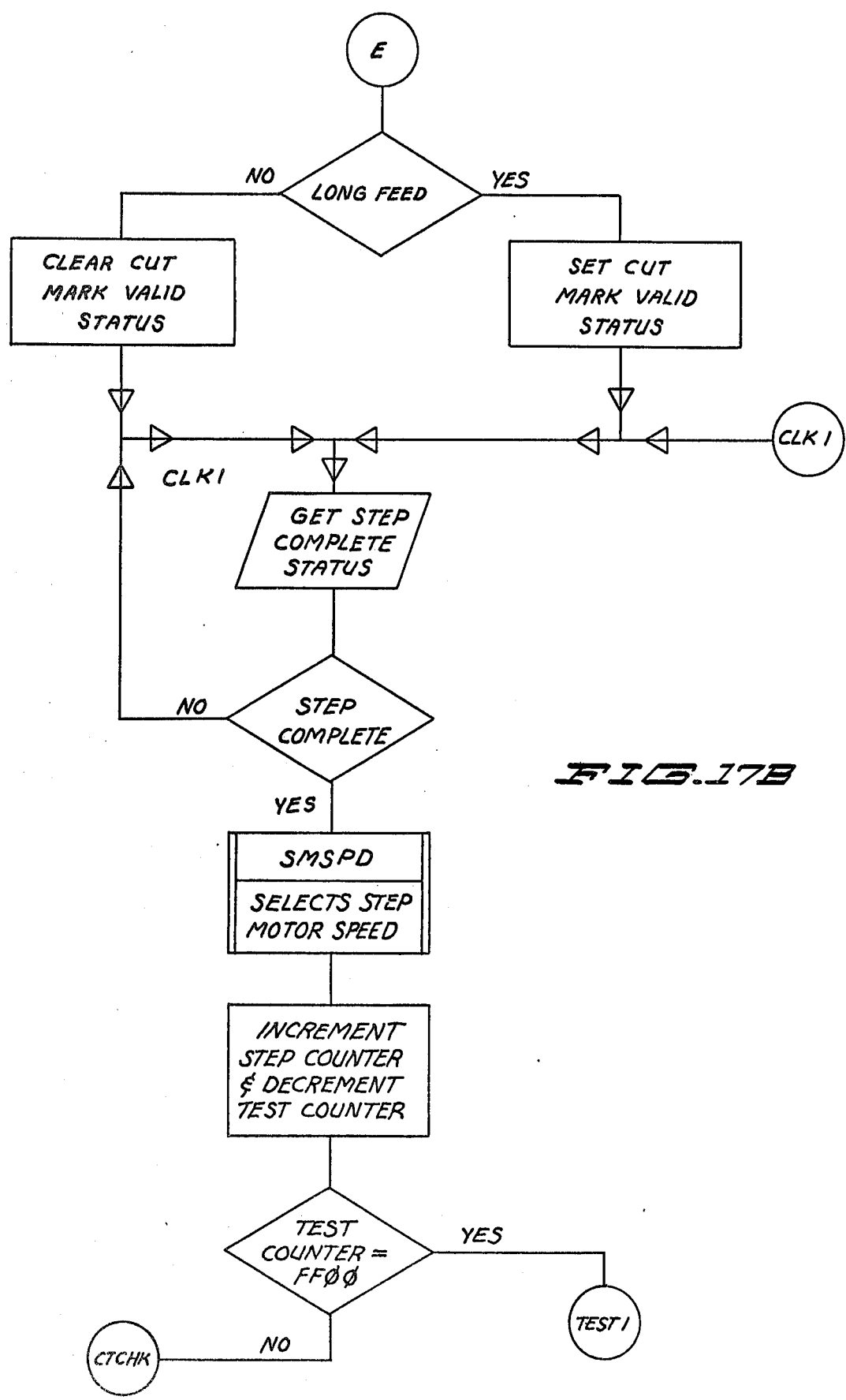

The next routines are the MOVE and the TEST routines, which actually determine the movement of stepper motor 40. FIGS. 17A and 17B illustrate the MOVE routine, and FIGS. 18A-18D illustrate the TEST routine. The MOVE and TEST routines control the number of steps taken by stepper motor 40 for normal automatic operation of the paper cutter, automatic operation in the event of a missing cut mark, and non-automatic operation when no cut marks are used. The determination of feed length under normal automatic operation of the paper cutter is the subject of the previously mentioned co-pending application entitled "Paper Feed Control for Photographic Paper Cutter". Similarly, determination of paper feed length in the case of an occasional missing cut mark is the subject of the previously mentioned co-pending application entitled "Photographic Paper Cutter with Automatic Paper Feed in the Event of Occasional Missing Cut Marks". A discussion of feed length determination under non-automatic operation is included in the previously mentioned co-pending application entitled "Microprocessor Controlled Photographic Paper Cutter". Reference should be made to these applications if a more detailed discussion of the MOVE and TEST routines is desired.

Figure 19B:
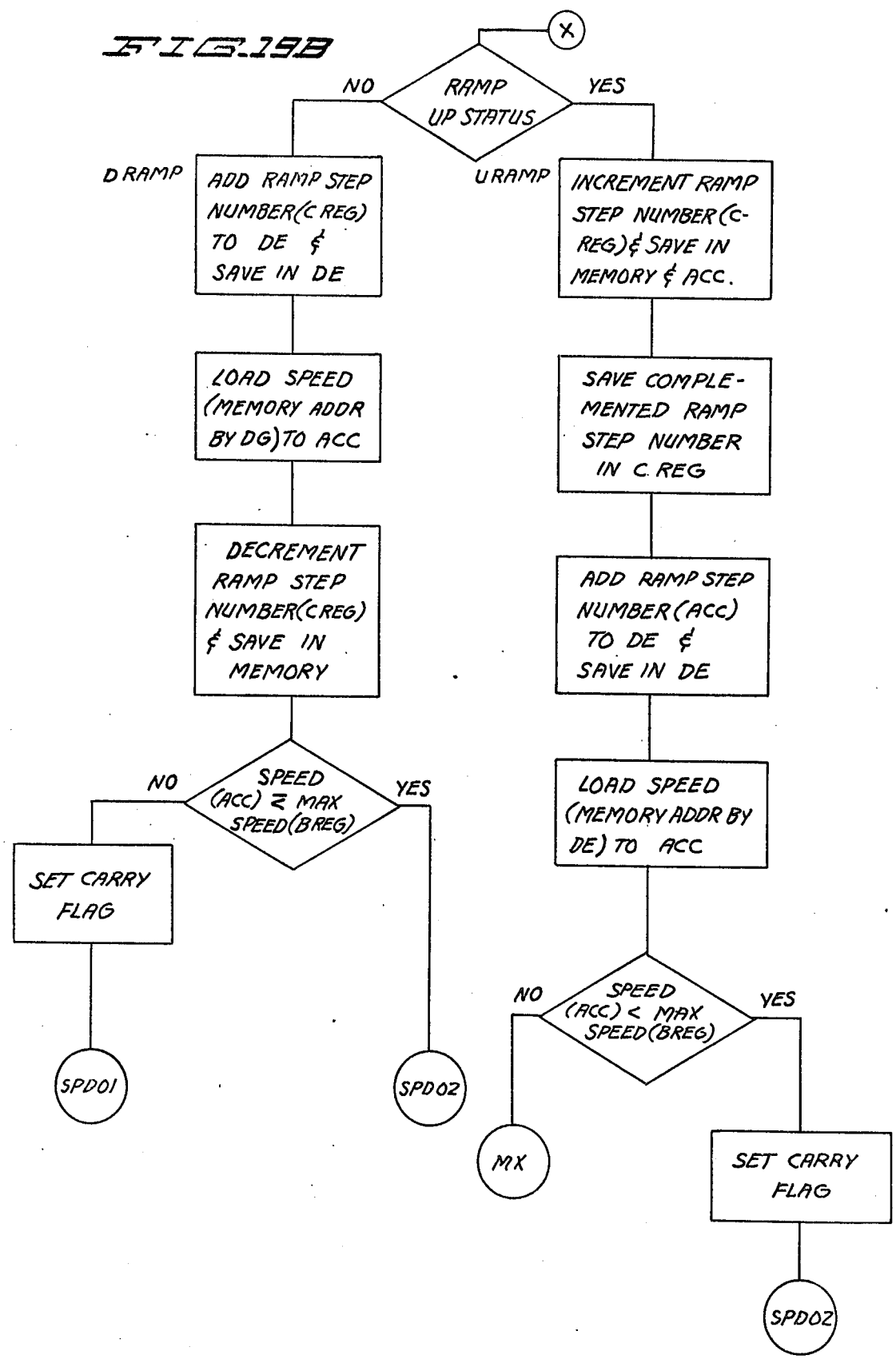

FIGS. 19A, 19B and 19C illustrate the SMSPD routine. This routine controls the speed of stepper motor 40 and determines whether stepper motor 40 is ramping up, ramping down, or is at a maximum or fixed speed.

When a paper feed-and-cut cycle is commenced, the speed of stepper motor 40 must be increased by an up ramp from the initial speed supplied by the MOTON call (FIG. 20) to the desired maximum speed. This maximum speed is then maintained until it is desired to stop the paper feed. A down ramp in stepper motor drive frequency is then generated so that the stepper motor decelerates before being brought to a complete stop.

Under the initial up ramp conditions, the number associated with a particular maximum speed selected by speed select switch 80 is retrieved from a lookup table and stored in the B register. Table 1 includes a lookup table for selected maximum speeds utilized in one preferred embodiment of the present invention. Ten possible stepper motor speeds are available from the lookup table shown in Table 1.

Table 1 also includes a lookup table used for both up ramp and down ramp operation of the stepper motor. A total of 40 numbers ranging from 16 to 99 are contained in the ramp lookup table shown in Table 1. The numbers are in a sequence which is generally increasing from 16 to 99. It should be noted, however, that on occasion, two numbers in a sequence may be the same, or a later number in a sequence may be less than the number preceding it. These variations in the generally increasing pattern of the sequence are required to provide the proper up ramp or down ramp associated with each of the numbers contained in the maximum speed lookup table shown in Table 1.

In the SMSPD routine, the number of steps taken to reach the maximum speed is monitored and stored in the C register. If the maximum speed has not been attained and an up ramp is not being generated, the ramp step number saved in the C register is incremented and saved in the memory and in the accumulator. The ramp step number is then complemented and stored in the C register, so that the number of steps in the reverse order required to reach that particular ramp step is known and stored. This information is necessary during down ramp operation since the same lookup table is used for generating both up ramps and down ramps with the numbers of the ramp lookup table being used in reverse sequential order during down ramp conditions.

If the speed which has been loaded into the accumulator is less than the maximum speed stored in the B register, the speed in the accumulator is outputted to programmable I/O device 184, and ultimately to the stepper motor clock 186. Since the maximum speed has not been attained, a conditional return causes the routine to return to the beginning.

If, on the other hand, the speed in the accumulator is greater than or equal to the maximum speed stored in the B register, the maximum speed is moved to the accumulator, and the maximum speed is outputted to programmable I/O device 184. The complement of the ramp step number at which the speed in the accumulator first reaches or exceeds the maximum speed is saved in the L register for use during the down ramp.

Once maximum speed has been attained, the maximum speed is maintained until it is time to begin the down ramp. The down ramp procedes in generally the same manner as the up ramp, except that the numbers from the ramp lookup table are taken from memory in reverse order, and the number in the sequence at the beginning of the down ramp is determined by the ramp down steps stored. If the speed in the accumulator is less than the maximum speed, the speed in the accumulator is outputted to programmable I/O device 184. Conversely, if the speed in the accumulator is greater than or equal to the maximum speed, the maximum speed is transferred to the accumulator and then outputted to the programmable I/O device.

When the end of the down ramp has been reached (as determined by the MOVE and TEST routines) an ENDPR routine (not shown in the Figures) is commenced which performs the necessary functions which must take place at the end of a paper feed-and-cut cycle. Further discussion of the ENDPR may be found in the co-pending application entitled "Microprocessor Controlled Photographic Paper Cutter."

CONCLUSION

The stepper motor speed control of the present invention provides up ramp and down ramp operation, as well as selection of maximum operating speeds, by the use of lookup tables and a microprocessor control. The up ramp and down ramp are generated by withdrawing numbers from a sequence in a lookup table. The numbers in the lookup table represent desired stepper motor speeds during the up ramp or down ramp. The stepper motor control circuitry controls the speed of the stepper motor as a function of the numbers supplied by the microprocessor.

It can be seen that the present invention permits great flexibility in the control of a stepper motor. By selecting the numbers stored in the lookup tables, a designer may select the manner of operation of the stepper motor from a wide range of possibilities. The stepper motor control of the present invention is very cost effective in those systems, like an automatic photographic paper cutter, in which a microprocessor is being used to control a variety of other functions of the apparatus. The control of stepper motor speed in addition to the various other functions controlled by the microprocessor is achieved with a minimum of additional hardware and additional computer programming.

Although the present invention has been described with reference to preferred embodiments, workers skilled in the art will recognize that changes may be made in form and detail without departing from the spirit and scope of the invention. For example, although the present invention has been described in the specific context of an automatic photographic paper cutter, it will be recognized that the stepper motor speed control may be applied to a wide variety of other systems as well, both within the photographic processing field and in other fields as well.

TABLE 1

```
;ROUTINE;EQU
;
;EQUATES FOR 451 PAPER CUTTER
;
;MEMORY INPUT PORTS
;
PAFD1    EQU    1000H    ;2 LSD OF PAPER FEED LENGTH
PAFD2    EQU    1001H    ;MSD OF PAPER FEED LENGTH
CTFD1    EQU    1002H    ;2 LSD OF FEED AFTER CUT MARK
CTFD2    EQU    1003H    ;MSD OF FEED AFTER CUT MARK
CTOUT    EQU    1004H    ;2 DIGITS,CUT OUT BETWEEN PRINTS
SPDSL    EQU    1005H    ;LSD-SELECTS MAX SPEED OF MTR
                         ;MSD-4 SWITCHES ON SENSOR AMP
MXPRS    EQU    1006H    ;MAX NUMBER OF PRINTS PER ORDER
IDVSW    EQU    1007H    ;INDIVIDUAL SWITCHES:
                         ;0-NO CUT MARK,1-TRIM,2-START,
                         ;4-7-MODE SELECTION
;
;ISOLATED INPUT PORTS
;
COREC    EQU    00FH     ;MACHINE KNIFE TO POINT
                         ;EDGE CORRECTION SWITCH
;
;BITS 0-6 OF THE FOLLOWING INPUT PORTS ARE LOW AND
; CONTAIN NO DATA.
;
STEPC    EQU    0F0H     ;BIT 7 HI FOR STEP COMPETE
CTSIG    EQU    0F1H     ;BIT 7 HI FOR CUT MARK
PREOO    EQU    0F2H     ;BIT 7 HI FOR PRINT END OF ORDER
PACK     EQU    0F3H     ;BIT 7 LO FOR PACKER CONNECTED
KNIFE    EQU    0F4H     ;BIT 7 LO FOR PACKER KNIFE ENABLE
CTCP     EQU    0F5H     ;BIT 7 LO FOR CUT COMPLETE
RJECT    EQU    0F6H     ;BIT 7 HI FOR REJECT THIS PRINT
RMAKE    EQU    0F7H     ;BIT 7 HI FOR REMAKE THIS PRINT
;
;ISOLATED OUTPUT PORTS
;
;PORT ADDRESSES BEGINNING WITH B AND E DO NOT USE
;INFORMATION ON THE DATA BUS.
;THE MOST SIGNIFICANT HEXADECIMAL DIGIT OF THE PORT
;ADDRESS SELECTS AN ADDRESSABLE LATCH AND BITS 0-2 SELECTS
;A SINGLE BIT IN THE LATCH. THE STATE OF THE SELECTED BIT
;IS DETERMINED BY BIT 3 OF THE PORT ADDRESS.
;
RCKOF    EQU    0B0H     ;RESET STEP COMPLETE F/F OFF
REOOF    EQU    0B1H     ;RESET END OF ORDER F/F OFF
RCSOF    EQU    0B2H     ;RESET CUT SIGNAL F/F OFF
SMCCW    EQU    0B3H     ;STEP MTR CCW(REVERSE)
SMSTP    EQU    0B4H     ;STEPPER MOTOR STOP
RRCOF    EQU    0B5H     ;RESET REMAKE/REJECT COUNTER OFF
RCKON    EQU    0B8H     ;RESET STEP COMPLETE F/F ON
REOON    EQU    0B9H     ;RESET END OF ORDER F/F ON
RCSON    EQU    0BAH     ;RESET CUT SIGNAL F/F ON
SMCW     EQU    0BBH     ;STEP MTR CW(FORWARD)
SMRUN    EQU    0BCH     ;STEPPER MOTOR RUN
RRCON    EQU    0BDH     ;RESET REMAKE/REJECT COUNTER ON
;
SPDGN    EQU    0DCH     ;SET FREQ OF STEPPER CLK SPD GEN
DISPY    EQU    0DDH     ;BCD TO 2 DIGIT DISPLAY
SMOFF    EQU    0E0H     ;STEPPER MOTOR OFF
CTOFF    EQU    0E1H     ;CUT SOLENOID OFF
RRSOF    EQU    0E2H     ;REMAKE-REJECT SENSOR NOT ENABLED
```

```
AVCOF    EQU    0E3H    ;ADVANCE COMPLETE OFF
EOOOF    EQU    0E4H    ;END OF ORDER OFF
PCTOF    EQU    0E5H    ;PRINT CUT OFF
SMON     EQU    0E8H    ;STEPPER MTR ON
CTON     EQU    0E9H    ;CUT SOLENOID ON
RRSON    EQU    0EAH    ;REMAKE-REJECT SENSOR ENABLED
AVCON    EQU    0EBH    ;ADVANCE COMPLETE ON
EOOON    EQU    0ECH    ;END OF ORDER ON
PCTON    EQU    0EDH    ;PRINT CUT ON
;
;ROUTINE EQUATES
;
ADVSW    EQU    04      ;DIAGNOSTIC ADVANCE SWITCH
CUTL     EQU    15      ;CUTL*1.0 MSEC=CUT SOL ON TIME
CUTTM    EQU    52      ;CUTTM*1.0MSEC=KNIFE RET TIME
CMVND    EQU    10      ;+ OR - VARIATION OF CUT MARK
                        ;LOCATION(# OF STEPS)
DSTOR    EQU    0FF80H  ;START OF DATA STORAGE
INITC    EQU    40H     ;INITIATE CONTINUE
MXMCM    EQU    2       ;MAX NUMBER OF MISSING CUT MARKS
PEDGE    EQU    110     ;PRINT EDGE TO KNIFE FEED LENGTH
SPDTB    EQU    700H    ;START OF LOOK UP TABLES
STOPS    EQU    70D     ;STOP SWITCH INTERRUPT
WHY0     EQU    0       ;TEST FOR NORMAL OPERATION
WHY4     EQU    STOPS   ;STOP SWITCH SELECTED
;
;ROUTINE:INIT
;
;THIS ROUTINE IS FOR INITIAL START UP AND THE
;INTERRUPTS.
;
INIT:
         LXI    H,DSTOR
         SPHL           ;INITIALIZE STACK POINTER
         JMP    INITC   ;ALLOW SPACE FOR FUTURE INTERRUPTS
         ORG    STOPS
STOPS:                  ;STOP SWITCH
         CALL   STOP    ;SAVE REASON FOR STOP & DISPLAY
                        ;PRINT COUNT
         POP    H       ;DUMP RETURN ADDRESS
         JMP    WORK
         ORG    INITC
INITC:                  ;INITIATE CONTINUED
         MVI    A,89H   ;A,B-OUTPUT C-INPUT
         OUT    DISPY+2 ;CONTROL TO PPI
         XRA    A       ;SET A =0
         CALL   NMOT2   ;SHOW DISPLAY=0
INITM:                  ;INITIALIZE MEMORY
         MOV    M,A     ;ALL DSTORE=0
         INR    L
         JNZ    INITM   ;IF HL=/0,JUMP
;
;ROUTINE:WORK
;
;THIS ROUTINE READS THE CONTROL SWITCHES AND STORES
;THE INFORMATION IN THE APPROPIATE LOCATION IN BINARY.
;
WORK:
         OUT    SMSTP   ;STOP STEPPER MOTOR
         OUT    SMOFF   ;TURN OFF STEPPER MOTOR
         OUT    REOON   ;RESET END OF ORDER F/F
         OUT    REOOF
         OUT    AVCOF   ;TURN OFF ADVANCE COMPLETE
         OUT    EOOOF   ;TURN OFF END OF ORDER
         XRA    A       ;A=0
         STA    TOT12   ;CLEAR FIRST TOTAL DISPLAYED
         STA    STOPM   ;RESET STOP IF SET
         STA    REOCM   ;CLEAR CUT MARK REQUIRED
         LXI    H,DSTOR ;RE-INITIALIZE STACK POINTER
         SPHL
         EI             ;ALLOW STOP SWITCH TO INTERRUPT
WORK1:
         LXI    D,SWSTM ;SWITCH STORAGE MEMORY
         LXI    H,IDVSW ;LOCATION OF INDIVIDUAL SWITCHES
```

```
         LDAY    D          ;OLD SWITCH STATE TO A
         MOV     C,A        ;SAVE OLD SWITCH STATES
CHECK:
         MOV     A,M        ;GET PRESENT SWITCH STATES
         MOV     B,A        ;SAVE SWITCH STATES
         XRA     C          ;STATES CHANGED?
         JZ      CHECK      ;NO, TRY AGAIN
         RRC
         RRC                ;TRIM CHANGE SETS CARRY
         JNC     PAKIN
         MVI     A,20       ;LOAD A FOR 20 MILLISECONDS
                            ;IF TRIM CHANGED
         JMP     DEBON
PAKIN:                      ;PACKER INPUT
         RRC                ;START ON SETS CARRY
         JNC     DEBON-2
         IN      PACK       ;PACKER CONNECTED
         ANA     A          ;SET FLAGS
         JM      DEBON-2
         CALL    DMS2       ;DEBOUNCE PACKER START INPUT 0.5 MS
         JMP     DEBON+3
         MVI     A,2        ;LOAD A FOR 2 MILLISECONDS
DEBON:                      ;DEBOUNCE
         CALL    DELAY      ;YES,DEBOUNCE SWITCH
         MOV     A,M        ;GET PRESENT SWITCH STATES
         XRA     B          ;HAVE ANY SWITCHES CHANGED?
         JNZ     CHECK      ;YES,TRY AGAIN
         MOV     A,B        ;NO, SWITCH STATES TO ACCUM
         STAX    D          ;SAVE SWITCH POSITION
         RRC                ;NO CUT MARK TO CARRY & A7
         INY     D          ;DE=NCTMS(NO CUT MARK STATUS)
         STAY    D          ;STORE NO CUT MARK STATUS
         RRC                ;TRIM TO CARRY
         CC      TRIM
         RRC                ;START TO CARRY
         JNC     WORK1
         RRC                ;MODE TO A0-A3
         ANI     OFH        ;SAVE MODE # & SET FLAGS
         EI
PROT1:   IF      PROT
         JZ      BEGIN      ;MODE 0?(      )
         DCR     A
         JZ      BEG1       ;MODE 1?(RUN)
         DCR     A
         JZ      MLEGT      ;MODE 2?(FEEDL)
         DCR     A
         JZ      MFACM      ;MODE 3?(FEEDA)
         DCR     A
         JZ      TOTAL      ;MODE 4?(TOTAL)
         DCR     A
         JZ      SENSE      ;MODE 5?(SENSE)
         DCR     A
         JZ      DIAG       ;MODE 6?(      )
         DCR     A
         JZ      WORK       ;MODE 7?(      )
         DCR     A
         JZ      WORK       ;MODE 8?(      )
         DCR     A
         JZ      TEST       ;MODE 9?(TEST)
         ENDIF
BEGIN:                      ;BEGINNING OF ORDER (CUT MARKS REQUIRED)
         MVI     A,80H
         STA     REQCM      ;SET CUT MARK REQUIRED
BEG1:                       ;BEGINNING OF ORDER (MISSING CUT MARKS ACCEPTABLE)
         PUSH    H
         LXI     H,WHY      ;LOWER BYTE ADDRESS OF LAST STOP
         MVI     A,WHY2+3 AND 0FFH     ;LOWER BYTE OF CUT MARK
                                       ;WRONG LOCATION ADDRESS
         CMP     M          ;LOWER ADDRESS BYTES EQUAL?
         MVI     M,0        ;CLEAR LOWER ADDRESS BYTE
         INX     H          ;HIGH BYTE ADDRESS OF LAST STOP
         JNZ     TEST4      ;JUMP IF LOWER ADDRESS BYTES NOT EQUAL
         MVI     A,(WHY2+3) SHR 8      ;HIGH BYTE OF CUT MARK
                                       ;WRONG LOCATION ADDRESS
```

```
         CMP     M           ;HIGH ADDRESS BYTES EQUAL?
TEST4:
         MVI     A,0
         MOV     M,A         ;CLEAR HIGH ADDRESS BYTE
         POP     H           ;RESTORE H
         JZ      TEST5       ;SAVE PREVIOUS PRINT COUNT
         STA     PRCT        ;SET PRINT COUNT TO ZERO
TEST5:
         STA     STOPM       ;RESET STOP IF SET
         OUT     SMON        ;TURN MOTOR ON
         MVI     A,18
         CALL    DELAY       ;KEEP MOTOR ON 18 MSEC
         IN      PREOO       ;NEW ROLL OF PAPER IF SET
         MOV     B,A         ;SAVE STATUS
         LDA     PWRON       ;ZERO IF JUST TURNED ON
         XRI     80H         ;COMPLEMENT MSB
         ORA     B           ;BIT 7 HI IF LONG FEED REQUIRED
         INX     D           ;D=LGNFD(LONG FEED)
         STAX    D
         DCX     H           ;M=MXPRS(MAX PRINTS SW)
         INX     D           ;D=MXPRM(MAX PRINTS MEM)
         MOV     A,M         ;MAX NUMBER PRINTS TO A
         STAX    D           ;STORE MAX PRINTS
         DCX     H           ;M=SPDSL(SPEED SELECT SW)
;
PSTAR:                       ;PRINT START
;
;INPUTS:DE=MXPPM(MAX PRINTS MEMORY ADDRESS)
;       HL=SPDSL(SPEED SELECT SWITCH ADDRESS)
;
         OUT     REOON       ;CLEAR END OF ORDER F/F
         MOV     A,M         ;SPEED SELECT IN
         ANI     0FH         ;MASK OFF UPPER 4 BITS
         MOV     B,A         ;SAVE SPEED SELECT
         CPI     9           ;TOP SPEED SELECTED?
         MVI     A,0         ;A7=0
         JNZ     CONT1       ;NO, THAN JUMP
         IN      PACK        ;BIT 7 LO IF PACKER USED
         ANI     80H         ;SET BIT 7 HI IF PACKER
                             ;NOT USED
CONT1:                       ;CONTINUE 1
         STA     CTELY       ;STORE CUT EARLY
         MOV     A,B         ;RESTORE SPEED SELECTED
         PUSH    H
         LXI     H,SPDTB     ;SPEED TABLE
         ADD     L
         MOV     L,A         ;SPDTB+A TO L
         MOV     A,M         ;LOOK UP MAX SPEED
         STA     MXSPD       ;STORE MAX SPEED
         POP     H
         DCX     H           ;M=CTOUT(CUT OUT LENGTH SW)
         MOV     B,M         ;GET CUT OUT LENGTH
         CALL    BCDBI       ;CHANGE TO BINARY
         INX     D           ;D=CTOTM(CUT OUT LENGTH MEM)
         STAX    D           ;STORE BINARY CUT OUT LENGTH
         DCX     H           ;M=CTFD2(FEED AFTER CUT 2)
         MOV     A,M         ;MSD OF SWITCH
         ANI     0FH         ;MASK OFF UPPER 4 BITS
         DCX     H           ;M=CTFD1(FEED AFTER CUT 1)
         MOV     B,M         ;2 LSD OF SWITCH
         CALL    BCDBI+2     ;CHANGE TO BINARY
         MOV     C,A         ;SAVE 2 LSD
         LDAX    D           ;GET CUT OUT LENGTH
         ANA     A           ;SET FLAGS
         CNZ     COADJ       ;MAKE ADJUSTMENT FOR CUT OUT
         MOV     A,C         ;GET ADJUSTED 2 LSD
         INX     D           ;D=ACTF1(AFTER CUT MARK FEED 1)
         STAX    D           ;2 LSD BINARY STORED
         INX     D           ;D=ACTF2(AFTER MARK FEED 2)
         MOV     A,B         ;MSD TO A
         STAX    D           ;MSD BINARY STORED
         DCX     H           ;M=PAFD2(PAPER FEED LENGTH 2)
         MOV     A,M         ;MSD OF SWITCH
         DCX     H           ;M=PAFD1(PAPER FEED LENGTH 1)
         MOV     B,M         ;2 LSD OF SWITCH
```

```
        CALL    BCDBI+2     ;CHANGE TO BINARY
        MOV     C,A         ;SAVE 2 LSD OF BINARY PAPER FEED REQUIRED
        LDA     CTOTM       ;CUT OUT LENGTH
        ANA     A           ;SET FLAGS
        CNZ     COADJ+1     ;MAKE ADJUSTMENT FOR CUT OUT
        LDA     NCTMS       ;NO CUT MARK STATUS
        RLC                 ;STATUS TO CARRY
        XCHG                ;M=ACTF2(AFTER CUT MARK FEED 2)
        CALL    MOTON       ;TURN MOTOR ON AND SET
                            ;MOTOR DIRECTION TO FORWARD
        JC      MOV1        ;JUMP IF NO CUT MARK
        OUT     REOOF       ;ENABLE END OF ORDER MARK
        LDA     LCNFD       ;LONG FEED
        ANA     A           ;SET FLAGS
        JP      MINFD       ;IF NOT LONG FEED, JUMP
        LXI     B,1500
        JMP     MOV1+2
;
;THIS ROUTINE DETERMINES THE MINIMUM FEED
;ALLOWED FOR A CUT MARK TO BE ACCEPTED. IT SUBTRACTS THE
;FEED AFTER CUT MARK AND HALF THE "WINDOW" THE CUT MARK
;SHOULD BE PRESENT IN FROM THE TOTAL PRINT FEED LENGTH.
;
MINFD:                      ;MINIMUM FEED
        MOV     A,C         ;GET 2 LSD OF FEED LENGTH
        DCX     H           ;M=ACTF1(AFTER CUT MARK FEED LENGTH 1)
        SUB     M           ;2 LSD OF FEED BEFORE CUT MARK
        JNC     CONT2       ;IF NO CARRY SKIP NEXT 2
        DCR     B           ;SUBTRACT BORROW
CONT2:                      ;CONTINUE 2
        SUI     CWIND       ;2 LSD OF FEED BEFORE CUT
                            ;MARK WINDOW
        MOV     C,A         ;C=2 LSD OF FEED BEFORE CUT MARK WINDOW
        INX     H           ;M=ACTF2(AFTER CUT MARK FEED 2)
        MOV     A,B         ;MSD OF FEED LENGTH
        SBB     M           ;MSD OF FEED BEFORE CUT MARK WINDOW
        MOV     B,A         ;B=MSD OF FEED BEFORE CUT MARK WINDOW
;
;ROUTINE:MOVE
;
;THIS ROUTINE DETERMINES THE MOVEMENT OF THE STEPPER
;MOTOR.  IF CUT MARK IS USED, BC CONTAINS THE NUMBER OF STEPS
;TO BE MOVED(1)BEFORE A CUT MARK IS VALID (OMITTED ON FIRST
;PRINT IN A ROLL OF PAPER OR AFTER POWER IS TURNED ON),
;(2)WHILE A CUT MARK IS VALID,(3)BEFORE RAMP DOWN,
;(4)UNTIL THE END OF PRINT.  IF NO CUT MARK IS
;USED, BC CONTAINS THE NUMBER OF STEPS TO BE
;MOVED(1)UNTIL THE END OF PRINT,(2) BEFORE RAMP
;DOWN(CORRECTED AFTER RAMP UP IS COMPLETE),(3) UNTIL
;THE END OF PRINT.
;
;INPUTS:BC-SEE ABOVE
;
;OUTPUTS:DE-TOTAL STEPS MOVED
;
MOV1:
        OUT     RCSON       ;DISABLE CUT SIGNAL IN
        OUT     RRSON       ;ENABLE REMAKE-REJECT SENSOR
        XRA     A           ;A=0
        MOV     D,A         ;D=0
        MOV     E,A         ;E=0
        INX     H           ;M=MSPDS(MAX SPEED STATUS)
        MOV     M,A         ;CLEAR MAX SPEED STATUS
        INX     H
        INX     H           ;M=RSTPN(RAMP STEP NUMBER)
        MOV     M,A         ;RAMP STEP #=0
        INX     H           ;M=URAPS(UP RAMP STATUS)
        MVI     M,80H       ;UP RAMP STATUS SET
        INX     H           ;M=RRPDN(READY RAMP DOWN)
        MOV     M,D         ;CLEAR READY TO RAMP DN
        INX     H           ;M=ACTM(AFTER CUT MARK)
        MOV     M,D         ;CLEAR AFTER CUT MARK
        INX     H           ;M=CTVAL(CUT MARK VALID)
        LDA     LONFD       ;BIT 7 HI IF LONG FEED
```

```
            MOV      M,A         ;CUT MARK VALID IF LONG
                                 ;FEED, OTHERWISE NOT VALID
CLK1:
            CALL     CLK         ;CHECK STEP & CUT SIGNAL
            JP       STEP        ;IF NO CUT SIGNAL JUMP
            OUT      RCSON       ;RESET CUT SIGNAL F/F ON
            STA      CTMNW       ;STORE CUT MARK THIS PRINT
            CALL     CMARK       ;CHANGE APPROPIATE FLAGS
            LHLD     ACTF1       ;FEED AFTER CUT MARK
            MOV      B,H         ;MOVE TO BC
            MOV      C,L
STEP:
            CALL     SMSPD       ;YES,CHECK SPEED
            INX      D           ;MOTOR STEP TOTAL
            DCR      C           ;DECREMENT BC
            JZ       BC0?
            MVI      A,0FFH
            CMP      C           ;C=FF?
            JNZ      CLK1
            DCR      B
            JMP      CLK1
BC0?:                            ;BC=0?
            XRA      A           ;A=0
            CMP      B
            JNZ      CLK1        ;JUMP IF BC=/0
;
;ROUTINE:TST
;
;THIS ROUTINE DETERMINES IF A CUT MARK IS ACCEPTABLE
;AND ALSO DETERMINES THE FEED LENGTH IF THERE IS NO
;CUT MARK.  IF THE CUT MARK OR ITS SUBSTITION HAS BEEN
;SENSED, AN INDICATION IS PROVIDED.
;
TEST1:
            LDA      NCTMS       ;NO CUT MARK STATUS
            ANA      A           ;SET FLAGS
            MVI      A,0         ;ZERO A REG, NO FLAG CHANGE
            LXI      H,RPDN      ;READY TO RAMP DOWN
            JM       RAMPD       ;JUMP IF NO CUT MARK STATUS
            CMP      M           ;READY TO RAMP DOWN
            JZ       ENDP?       ;NO, THEN CHECK END OF PRINT
RAMPD:                           ;RAMP DOWN
            MOV      M,A         ;CLEAR READY TO RAMP DOWN
            DCX      H
            DCX      H           ;M=RSTPN(RAMP STEP NUMBER)
            MOV      B,A         ;B=0
            MOV      C,M         ;C=NUMBER STEPS TIL END OF PRINT
            CMP      C           ;C=0
            JZ       ENDPR       ;YES,END OF PRINT
            DCX      H
            DCX      H           ;M=MSPDS(MAX SPEED STATUS)
            MOV      M,A         ;CLEAR MAX SPEED
            LDA      CTELY       ;CUT EARLY
            ANA      A           ;SET FLAGS
            JP       CLK1        ;JUMP IF NOT EARLY CUT
            CUT      CTON        ;TURN ON CUT SOLENOID
            JMP      CLK1
ENDP?:                           ;CHECK FOR END OF PRINT
            INX      H           ;M=ACTM(AFTER CUT MARK)
            CMP      M
            JNZ      ENDPR       ;JUMP IF AFTER CUT MARK
            INX      H           ;M=CTVAL(CUT MARK VALID)
            CMP      M           ;LOOKING FOR CUT MARK?
            JNZ      NOCTM       ;YES, GO TO NO CUT MARK SENSED
            OUT      RCSOF       ;ENABLE CUT SIGNAL
            LXI      B,2*CWIND   ;BC=CUT MARK WINDOW
            MVI      A,80H
            MOV      M,A         ;SET CUT VALID
            JMP      CLK1
NOCTM:                           ;NO CUT MARK SENSED
            MOV      M,A         ;CLEAR CUT MARK VALID
            OUT      RCSON       ;DISABLE CUT SIGNAL
            STA      CTMNW       ;CLEAR CUT MARK THIS PRINT
            DCX      H           ;M=ACTM(AFTER CUT MARK)
            LDA      LONFD       ;LONG FEED STATUS
```

```
        ANA     A           ;SET FLAGS
        JP      WHY1+6
WHY1:
        CALL    STOP        ;NO CUT MARK YET SO STOP
        JMP     WORK
        INX     H
        INX     H           ;M=MISCM(CUT MARK YET TO MISS)
        DCR     M
        LDA     REQCM       ;BIT 7 HI IF CUT MARK REQUIRED
        ORA     M
        JP      WHY2+6
WHY2:
        CALL    STOP        ;STOP IF TOO MANY MISSING MARKS
        JMP     WORK
        INX     H           ;M=PFD1(PAPER FEED 1)
        MOV     A,M
        SUB     E
        MOV     C,A
        INX     H           ;M=PFD2(PAPER FEED 2)
        MOV     A,M
        SBB     D
        MOV     B,A         ;BC=STEPS TO END OF PRINT
        LDA     RSTDN       ;GET NUMBER OF RAMP DOWN STEPS
        CMA
        MOV     L,A
        CALL    RPDNA       ;CORRECT FOR RAMP DOWN STEPS
        MVI     A,80H       ;SET BIT 7
        CALL    CMARK       ;CHANGE APPROPIATE FLAGS
        JMP     CLK1
;
;THIS ROUTINE SETS APPROPIATE FLAGS AFTER A CUT
;MARK HAS BEEN SENSED OR AFTER A MISSING CUT MARK
;HAS BEEN ACCEPTED.
;
;INPUTS:BIT 7 OF A REG IS SET HI
;
CMARK:                      ;CUT MARK
;
        LXI     H,RRPDN     ;READY TO RAMP DOWN
        MOV     M,A         ;STORE READY TO RAMP DN
        INX     H           ;M=ACTM(AFTER CUT MARK)
        MOV     M,A         ;STORE AFTER CUT MARK
        INX     H           ;M=CTVAL(CUT MARK VALID)
        XRA     A           ;A=0
        MOV     M,A         ;CLEAR CUT MARK VALID
        RET
;
;ROUTINE:SETUP
;
;THIS ROUTINE CONTAINS THE NECESSARY FUNCTIONS FOR
;INITIAL SET UP CALIBRATION OF THE PAPER CUTTER.THESE
;FUNCTIONS ARE:
;       MLEGT-MEASURES THE LENGTH OF THE PRINT FROM CUT
;MARK TO CUT MARK.
;       MFACM-MEASURES THE DISTANCE THE PAPER MOVES AFTER
;THE CUTMARK IS SENSED UNTIL IT IS CUT. IT REQUIRES THE
;OPERATOR TO POSITION THE LEADING EDGE OF THE PRINT TO A
;PREDETERMINED POINT.
;
MLEGT:                      ;MEASURE LENGTH
        CALL    MOTON
        LXI     D,0         ;RESET FEED LENGTH
CLK1C:                      ;CLOCK CALL 1
        CALL    CLK         ;TAKE STEP
        JM      CLK2C-3     ;IF CUT MARK,JUMP
        CALL    CT999       ;INCREMENT FEED LENGTH DE
        JZ      FEEDL       ;FEED TOO LONG
        JMP     CLK1C
        LXI     D,0         ;RESET FEED LENGTH
CLK2C:                      ;CLOCK CALL 2
        CALL    CLK         ;TAKE STEP
        JM      FEED1       ;IF CUT MARK SENSED,JUMP
        CALL    CT999       ;INCREMENT FEED LENGTH DE
        JZ      FEEDL       ;FEED TOO LONG
        JMP     CLK2C       ;TAKE A STEP
```

```
FEED1:                          ;MEASURED FEED LENGTH
        OUT     SMSTP           ;STOP STEPPER MOTOR
        MOV     A,E             ;SET UP FOR DISPLAY
        CALL    NMOT4
        XCHG                    ;MOVE MEASURED FEED LENGTH TO HL
        SHLD    MFDL            ;SAVE MEASURED FEED LENGTH
        JMP     FEEDL
MFACM:                          ;MEASURE FEED AFTER CUT MARK
        CALL    MOTON
        IN      CCREC           ;GET KNIFE TO PRINT EDGE CORRECTION
        ANI     01FH            ;MASK OUT UPPER 3 BITS
        MVI     B,PEDGE         ;GET PRINT EDGE TO KNIFE LENGTH
        ADD     B               ;ADD CORRECTION
        MOV     B,A             ;SAVE LENGTH
CLK3C:                          ;CLOCK CALL 3
        CALL    CLK             ;TAKE STEP
        DCR     B               ;B=DISTANCE TO KNIFE
        JM      CLK4C-6         ;IF EDGE AT KNIFE JUMP
        JMP     CLK3C           ;IF NOT, TAKE A STEP
        LXI     D,0
        CALL    CT999           ;INCREMENT DE
        JZ      FEEDL           ;FEED TOO LONG
CLK4C:                          ;CLOCK CALL 4
        CALL    CLK             ;TAKE STEP
        JM      FEED2           ;IF CUT MARK JUMP
        JMP     CLK4C-6
FEED2:
        OUT     SMSTP           ;STOP STEPPER MOTOR
        LHLD    MFDL            ;MEASURED FEED LENGTH
        MOV     A,D             ;BCD FEED BEFORE CUT MARK
        MOV     B,E
        CALL    BCDBI+2         ;CONVERT TO BINARY
        MOV     D,B             ;BINARY FEED BEFORE CUT
        MOV     E,A
        MOV     A,H             ;BCD FEED LENGTH
        MOV     B,L
        CALL    BCDBI+2         ;CONVERT TO BINARY
        SUB     E               ;DETERMINE 2 LSD
        MOV     E,A             ;SAVE 2 LSD
        MOV     A,B             ;MSD OF BINARY FEED LENGTH
        SBB     D               ;DETERMINE MSD
        MOV     D,A
        CALL    BIBCD           ;CONVER TO BCD
        MOV     E,A             ;SAVE 2 LSD
        CALL    NMOT4           ;DISPLAY MEASURED FEED AFTER CUT
                                ;MARK LENGTH
        XCHG
        SHLD    MFDAC           ;SAVE MEASURED FEED AFTER
                                ;CUT MARK LENGTH
FEEDL:                          ;FEED LONG
        XRA     A               ;A=0
        STA     PWRON           ;CLEAR PWRON
        JMP     WORK
MOTON:                          ;MOTOR ON
        MVI     A,16H           ;SLOW SPEED SELECT
        OUT     SPDGN           ;SLOW SPEED OUT
        OUT     SMCW            ;STEPPER MTR CW(FORWARD)
        OUT     SMON            ;TURN ON STEPPER MTR
        OUT     SMRUN           ;RUN STEPPER MOTOR
        OUT     RCKON           ;RESET STEP COMP F/F
        OUT     RCKOF
        OUT     RCSON           ;CLEAR CUT SIGNAL F/F
        OUT     RCSOF
        RET
;
;THIS CALL LOOKS FOR THE STEPPER MOTOR TO COMPLETE
;ONE STEP.  IF THE STEP HAS NOT BEEN COMPLETED WITHIN
;APPROXIMATELY 5 MILLISECONDS, CONTROL WILL BE
;RETURNED TO "WORK" WHERE THE STACK WILL BE INITILIZED
;TO REMOVE THE RETURN ADDRESS & DATA SAVED ON THE
;STACK.  UPON STEP COMPLETION, THE MINUS FLAG IS SET
;IF A CUT MARK HAS BEEN SENSED.
;
CLK:                            ;STEPPER MOTOR CLOCK
```

```
        PUSH    B
        MVI     B,0         ;TIME OUT COUNTER
        INR     B           ;INCREMENT TIMER
        JNZ     WHY3+6
WHY3:
        CALL    STOP
        JMP     WORK
        IN      STEPC       ;STEP COMPLETE
        ANA     A           ;SET FLAGS
        JP      CLK+3       ;NO, TRY AGAIN
        POP     B
        OUT     RCKON       ;RESET STEP COMP F/F
        OUT     RCKOF
        IN      CTSIG       ;GET CUT SIGNAL
        ANA     A           ;SET FLAGS
        RP                  ;IF NO SIGNAL, RETURN
        OUT     RCSON       ;CLEAR CUT SIGNAL F/F
        OUT     RCSOF
        RET
;
;THIS CALL INCREMENTS THE BCD CONTENTS OF REGISTER
;PAIR DE BY ONE COUNT.  IF THE COUNT IS LESS THAN
;1000, ZERO IS NOT SET ON RETURN.
;
LT999:                      ;COUNT DE TO 999
        ANA     A           ;CLEAR CARRY
        MOV     A,E         ;GET 2 LSD
        INR     A           ;INCREMENT 2 LSD
        DAA                 ;MAKE SURE THEY ARE BCD
        MOV     E,A         ;SAVE 2 LSD
        RNC                 ;IF NO CARRY RETURN
        MOV     A,D         ;GET MSD
        INR     A           ;INCREMENT MSD
        MOV     D,A         ;SAVE MSD
        CPI     0AH         ;ZERO FLAG SET IF DE=1000
        RET
;
;ROUTINE:TOTA
;
;THIS ROUTINE DISPLAYS THE TOTALS OF PRINTS CUT
;& ORDERS COMPLETED SINCE POWER ON.  THE FOLLOWING
;SEQUENCE IS USED TO DISPLAY THE DATA:(1) 2 MSD OF
;PRINTS CUT,(2) 4 LSD OF PRINTS CUT,(3) 2 MSD OF
;ORDERS CUT,(4) 4 LSD OF ORDERS CUT.  AFTER (4) HAS
;BEEN DISPLAYED, THE SEQUENCE STARTS OVER AT (1).
;
;DESTROYS:A,B
;
TOTAL:
        LDA     TOT12       ;BIT 7 HI IF THIS IS
                            ;FIRST TOTAL DISPLAYED
        ANA     A           ;SET FLAGS
        JM      TOT2        ;JUMP IF NOT FIRST DISP
        MVI     B,4         ;SET NUMBER OF PASSES
        LXI     H,PRCT1+2   ;2 MSD OF PRINTS CUT
DIG2:                       ;DISPLAY 2 DIGITS
        MOV     A,M         ;GET 2 DIGITS
        CALL    NMOT2       ;DISPLAY 2 DIGITS
        MVI     A,80H
        STA     TOT12       ;SET FIRST TOTAL DISPLAYED
TOT3:
        STA     DIG4S       ;STORE DISPLAY 4 DIGITS STATUS
        PUSH    H           ;SAVE LOCATION OF LAST
                            ;DIGITS DISPLAYED
        DCR     B           ;DECREMENT PASS COUNTER
        LXI     D,SWSTM     ;SWITCH STATUS MEMORY
        PUSH    B           ;SAVE PASS COUNTER
        JNZ     WORK1       ;JUMP IF NOT LAST PASS
        JMP     WORK        ;CLEAR TOT12 THIS TIME
TOT2:
        POP     B           ;GET PASS COUNTER
        POP     H           ;GET LOCATION OF LAST DIGITS DISPLAYED
        DCX     H           ;LOCATION OF NEXT 2 DIGITS
                            ;TO BE DISPLAYED
        LDA     DIG4S       ;BIT 7 HI IF 4 DIGITS
```

```
          ANA    A             ;SET FLAGS
          JP     DIG2          ;JUMP IF 2 DIGITS TO BE DISPLAYED
          MOV    D,M           ;2 MSD TO BE DISPLAYED TO D
          DCX    H
          MOV    A,M           ;2 LSD TO A
          STC                  ;SHOWING LEADING ZEROS
          CALL   NMOT4         ;DISPLAY 4 DIGITS
          XRA    A             ;A=0
          JMP    TOT3
;
;ROUTINE:SENS
;
;THIS ROUTINE ALLOWS THE CUT MARK TO BE
;MOVED BACK AND FORTH IN FRONT OF THE SENSOR
;SO THAT IT MAY BE PROPERLY ADJUSTED.
;
SENSE:
          CALL   MOTON         ;TURN MOTOR ON
          LXI    D,400         ;START COUNT AT 400
NMARK:                         ;CHECK FOR MARK
          CALL   CT999
          JZ     FEEDL         ;FEED TOO LONG
          CALL   CLK
          JP     NMARK         ;IF NO CUT MARK JUMP
          MVI    B,50          ;PRELOAD STEP COUNT
FWD:                           ;FORWARD DIRECTION
          CALL   CLKS
          JM     FEEDL         ;GO BACK IF STOP SW SELECTED
          OUT    SMCCW         ;GO BACKWARDS
REV:                           ;REVERSE DIRECTION
          CALL   CLKS
          JM     FEEDL         ;GO BACK IF STOP SW SELECTED
          OUT    SMCW          ;GO TOWARDS KNIFE
          JMP    FWD
CLKS:                          ;SENSOR CLOCK
          CALL   CLK
          DCR    B             ;DECREMENT STEP COUNT
          JNZ    CLKS          ;IF STEP COUNT =/ 0 TAKE
                               ;ANOTHER STEP
          MVI    B,100         ;PRELOAD STEP COUNT
          LDA    STOPM         ;BIT 7 HI IF STOP SWITCH
                               ;ENERGIZED
          ANA    A             ;SET FLAGS
          RP                   ;GO BACK IF NOT READY TO STOP
          MVI    A,0           ;A=0 & FLAGS NOT CHANGED
          STA    STOPM         ;CLEAR STOP
          RET
;
;ROUTINE:STOP
;
;THIS ROUTINE WILL DISPLAY THE NUMBER OF PRINTS
;CUT IN THE PRESENT ORDER IF THE CUTTER HAS
;STOPPED. IT WILL STORE THE ADDRESS THAT CAUSED
;IT TO STOP.
;
STOP:
          XRA    A             ;A=0
          STA    PWPON         ;ALLOW LONG FEED NEXT TIME
          STA    CTMNW         ;NO CUT MARK ON LAST PRINT
STOP1:
          LDA    PRCT          ;NUMBER OF PRINTS CUT
                               ;THIS ORDER
          ANA    A             ;CLEAR CARRY FOR LEADING
                               ;ZERO SUPPRESSION
          CALL   NMOT2         ;DISPLAY PRINTS CUT
          POP    H             ;WHAT ADDRESS CAUSED STOP
          SHLD   WHY           ;SAVE FOR FUTURE CHECK
          PUSH   H             ;PUT BACK FOR RETURN
          RET
;
;ROUTINE:ENDP
;
;THIS ROUTINE PERFORMS THE NECESSARY FUNCTIONS THAT TAKE
;PLACE AT THE END OF A PRINT.
;
```

```
ENDPR:                    ;END OF PRINT
        OUT     RRSOF     ;DISABLE REMAKE-REJECT SENSOR
        OUT     AVCON     ;TELL PACKER READY TO CUT
        OUT     SMSTP     ;STEPPER MOTOR STOP
        IN      PREOO     ;PRINT END OF ORDER
        ANA     A
        MOV     B,A       ;SAVE END OF ORDER STATUS
        JP      NEOO
        OUT     EOOON     ;END OF ORDER TO PACKER
NEOO:                     ;NO END OF ORDER
        IN      PACK      ;PACKER STATUS
        ANA     A         ;SET FLAGS
        JM      NPAC1
        LXI     H,0
NIFEN:                    ;KNIFE ENABLE
        LDA     STOPM     ;OPERATOR TIRED OF WAITING?
        CPI     80H
        JNZ     WHY6+6
WHY6:   CALL    STOP1
        JMP     WORK
        INR     L         ;DELAYS UNTIL HL OVERFLOWS
        JNZ     NIFIN
        INR     H
        JNZ     NIFIN
        OUT     SMOFF     ;TURN OFF STEPPER MTR IF
                          ;TOO LONG A WAIT
NIFIN:                    ;INPUT KNIFE ENABLE
        IN      KNIFE     ;PACKER KNIFE ENABLE
        ANA     A         ;SET FLAGS
        JM      NIFEN     ;SIGNAL HERE?
        CALL    DMS2      ;YES, DEBOUNCE 0.5 MSEC.
        IN      KNIFE
        ANA     A
        JM      NIFEN
        OUT     SMON      ;TURN MOTOR ON FOR CUT
NPAC1:                    ;NO PACKER
        OUT     AVCOF     ;TURN OFF ADVANCE COMPLETE
        PUSH    PSW
        LDA     CTELY     ;CUT EARLY
        ANA     A         ;SET FLAGS
        OUT     PCTON     ;PRINT CUT (ON) TO PACKER
        CP      TRIM      ;IF NOT EARLY CUT
        CM      TRIM1     ;IF EARLY CUT, TAKE LESS TIME
        POP     PSW
        LXI     H,PRCT    ;PRINTS CUT THIS ORDER
        MOV     A,M       ;GET PRINTS CUT THIS ORDER
        INR     A         ;NEW PRINT COUNT
        DAA
        MOV     M,A       ;SAVE NEW COUNT
        MOV     C,A       ;PRINTS THIS ORDER
        IN      PACK      ;PACKER CONNECTED?
        CMA
        ORA     B         ;COMBINE STATUS CONDITIONS
        JP      DSPRT+3   ;JUMP IF NEITHER
        MOV     A,C       ;GET COUNT BACK FOR OUTPUT
DSPRT:                    ;DISPLAY PRINT COUNT
        CALL    NMOT2     ;SHOW NEW COUNT
        LXI     H,MXPRM   ;M=MX NUMBER OF PRINTS THIS ORDER
        MOV     A,M
        CPI     0         ;CONTINOUS CUT IF 0
        JNZ     MXPR?
        MOV     C,A
        INR     A         ;MAKE A>C
MXPR?:                    ;MAXIMUM NUMBER OF PRINTS
        SUB     C         ;A=0 IF MAX COUNT
        MOV     C,A       ;SAVE MAX COUNT STATUS
        LXI     H,ORDCT-1
        MOV     A,B       ;END OF ORDER STATUS
        XRI     80H       ;COMPLEMENT MSB
        PUSH    D         ;SAVE FEED LENGTH
        CALL    BCDIN+1   ;INCREMENT END OF ORDER
                          ;TOTAL IF APPROPIATE
        CALL    BCDIN     ;INCREMENT TOTAL PRINT COUNT
        POP     D         ;GET FEED LENGTH
        INX     H         ;M=CTMNW(CUT MARK NEW)
```

```
            MOV     A,M         ;CUT MARK THIS CUT
            ANA     A           ;SET FLAGS
            INX     H           ;M=CTMOD(CUT MARK OLD)
            JP      CTDLY       ;IF NO CUT MARK JUMP
            CMP     M
            JNZ     CTDLY       ;JUMP IF LAST PRINT NO CUT MARK
            MVI     A,MXMCM     ;MAX MISSING CUT MARKS
            STA     MISCM       ;STORE ABOVE
            XCHG
            SHLD    PFD1        ;STORE FEED LENGTH OF LAST PRINT
            JMP     CTDLY+1
CTDLY:                          ;CUT DELAY FOR KNIFE RETURN
            MOV     M,A         ;CUT MARK STATUS FOR NEXT PRINT
            MVI     A,CUTTM     ;CUT TIME AFTER SOLENOID IS
                                ;ENERGIZED
            CALL    DELAY       ;WAIT FOR KNIFE TO COMPLETE CYCLE
            OUT     PCTOF       ;PRINT CUT(OFF) TO PACKER
            LDA     CTOTM       ;CUT OUT LENGTH
            ANA     A           ;SET FLAGS
            JZ      TEST2       ;IF NO CUT OUT, JUMP
            OUT     SMRUN
            MOV     D,A         ;SAVE CUT OUT LENGTH
CLK2:
            CALL    CLK         ;CHECK STEP COMPLETE
            DCR     D           ;DECREASE CUT OUT LENGTH
            JNZ     CLK2        ;TO MOVE & IF NOT ZERO JUMP
            OUT     SMSTP
            CALL    TRIM
            MVI     A,CUTTM
            CALL    DELAY       ;WAIT FOR KNIFE TO COMPLETE CYCLE
TEST2:
            STA     LGNFD       ;RESET LONG FEED
EOO?:                           ;END OF ORDER?
            MVI     A,30H
            STA     PWRON       ;SET FIRST PRINT CUT STATUS
            CMP     B           ;END OF ORDER?
            JZ      HOLD        ;YES, GO WAIT FOR NEXT ORDER
            MOV     A,C         ;MAX COUNT STATUS
            ANA     A           ;SET FLAGS
            JNZ     WHYS+6
WHYS:
            CALL    STOP1
            JMP     HOLD
            LXI     H,SPDSL     ;SPEED SELECT
            LXI     D,MXPRM     ;MAX PRINTS MEMORY
            JMP     PSTAR       ;START NEXT PRINT
HOLD:
            MVI     A,20
            CALL    DELAY
            JMP     WORK
;
;ROUTINE:BCDB
;
;THIS PROGRAM WILL TAKE 0-999 COMPLEMENTED DECIMAL AND
;CONVERT IT TO BINARY(0-3E7H). REGISTER A CONTAINS MSD
;AND REGISTER B CONTAINS THE TWO LSD.
;
;D1=MSD       D2=2MSD      D3=LSD
;
;FUNCTION:BCDBI
;
;INPUTS:A,B CONTAIN BCD DATA
;
;OUTPUTS:A=2LSD AND B=MSD IN BINARY
;
;DESTROYS:A,B,C,FLAGS
;
BCDBI:
            MVI     A,0H        ;START FOR TWO DIGITS
            ANI     0FH         ;START FOR THREE DIGITS
                                ;MASK OFF UPPER 4 BITS
            PUSH    D
            PUSH    H
            MOV     C,A         ;SAVE D1
            RLC                 ;A=2 D1
```

```
        RLC                 ;A=4 D1
        ADD     C           ;A=5 D1
        RLC                 ;A=10 D1
        MOV     L,A         ;STORE 10 D1
        MVI     H,0         ;H=0
        MOV     A,B         ;GET D2 AND D3
        ANI     0FH         ;SAVE D2
        RRC
        RRC
        RRC
        RRC
        ADD     L           ;A=10 D1 + D2
        MOV     L,A         ;L=10 D1 + D2
        MOV     E,L         ;E=10 D1 + D2
        MOV     D,H         ;D=0
        DAD     H           ;HL=2(10 D1 + D2)
        DAD     H           ;HL=4(10 D1 + D2)
        DAD     D           ;HL=5(10 D1 + D2)
        DAD     H           ;HL=10(10 D1 + D2)
        MOV     A,B         ;GET D2 AND D3
        ANI     0FH         ;SAVE D3
        MOV     E,A         ;DE=D3
        DAD     D           ;HL=100 D1 + 10 D2 + D3
        MOV     B,H
        MOV     A,L
        POP     H
        POP     D
        RET
;
;ROUTINE:BCDI
;
;THIS ROUTINE INCREMENTS A SIX PLACE DECIMAL
;NUMBER IN MEMORY.  INCREMENTS OCCUR AT CONDITIONAL ENTRY
;POINT ONLY IF A=0.
;
;INPUTS:HL -POINTS TO TWO LSD LESS 1 LOCATION
;
;DESTROYS:A,D,H,L
;
BCDIN:                      ;BCD  INCREMENT
        XRA     A           ;A=0
        MVI     D,4         ;CONDITIONAL ENTRY POINT
        DCR     D
        RZ                  ;RETURN IF 4TH PASS
        INX     H           ;LOCATION OF NUMBER TO BE
                            ;INCREMENTED
        ANA     A           ;SET FLAGS
        JNZ     BCDIN+3     ;DON'T INCREMENT IF A =/ 0
        MOV     A,M         ;GET 2 DIGITS
        INR     A
        DAA
        MOV     M,A         ;RETURN 2 DIGITS
        JMP     BCDIN+3     ;CONTINUE
;
;ROUTINE:BIBC
;
;THIS ROUTINE CONVERTS A BINARY NUMBER NOT
;GREATER THAN 3CEH TO BCD FORM.
;
;INPUTS:DE-CONTAINS BINARY VALUE(0-3CEH) TO BE
;CONVERTED
;
;OUTPUTS:D-CONTAINS MSD BCD IN 4 LOWER BITS
;       A-CONTAINS 2 LSD BCD
;
;DESTROYS:B,C,D,E,H,L
;
;FUNCTION:BTBCD
;
BIBCD:
        LXI     B,100
        CALL    DIGIT
        PUSH    H           ;SAVE MSD BCD
        LXI     B,10
        CALL    DIGIT
```

```
        MOV     A,H
        RRC
        RRC
        RRC
        RRC
        MOV     L,A             ;SAVE DIGIT
        LXI     B,1
        CALL    DIGIT
        MOV     A,H             ;GET LSD BCD
        ADD     L               ;MERGE 2 LSD BCD
        POP     D               ;RETURN MSD BCD
        RET
;
;THIS ROUTINE SUBTRACTS THE CONTENTS OF REGISTER
;PAIR BC FROM THE CONTENTS OF REGISTER PAIR
;DE.  EACH TIME THE REMAINDER IS GREATER THAN OR EQUAL
;TO ZERO, THE H REGISTER(BCD DIGIT) IS INCREMENTED.
;WHEN THE REMAINDER IS LESS THAN ZERO, AN ADJUSTMENT
;IS MADE SO THAT A POSITIVE NUMBER REMAINS.
;
DIGIT:
        MVI     H,0             ;INITIALIZE DIGIT
DI0:
        MOV     A,E             ;SUBTRACT LOOP
        SUB     C
        MOV     E,A
        MOV     A,D
        SBB     B
        MOV     D,A
        JM      DI1
        INR     H               ;INCREMENT BCD DIGIT
        JMP     DI0
DI1:                            ;ADJUST FOR NEXT SEQUENCE
        MOV     A,E
        ADD     C
        MOV     E,A
        MOV     A,D
        ADC     B
        MOV     D,A
        RET
;
;ROUTINE:CCADJ
;
;THIS ROUTINE SUBTRACTS EITHER THE FULL VALUE OR HALF
;VALUE IN REG A FROM THE VALUE IN REG BC.  IT IS
;USED TO ADJUST THE TOTAL FEED LENGTH AND THE
;FEED AFTER CUT MARK LENGTH WHEN THERE IS A CUT OUT.
;
;INPUTS:A,B,C
;
;OUTPUTS:B,C
;
CCADJ:                          ;CUT OUT ADJUSTMENT
        RAR                     ;ENTRY POINT FOR HALF VALUE
        PUSH    D               ;ENTRY POINT FOR FULL VALUE
        MOV     D,A             ;SAVE VALUE
        MOV     A,C             ;GET 2 LSD
        SUB     D               ;SUBTRACT VALUE
        MOV     C,A             ;SAVE 2 LSD
        MOV     A,B             ;GET MSD
        SBI     0               ;SUBTRACT BORROW IF ANY
        MOV     B,A             ;SAVE MSD
        POP     D
        RET
;
;ROUTINE:DELAY
;
;THIS ROUTINE GENERATES DELAYS IN 1 MILLISECOND
;INCREMENTS.  ACCUMULATOR CONTAINS THE (HEXADECIMAL)
;LENGTH OF THE DELAY IN MILLISECONDS.
;
;INPUTS:A
;
DELAY:
        CALL    DMSEC
```

```
            DCR     A
            JNZ     DELAY       ;TRY TIL TIME IS UP
            RET
;
;ROUTINE:DMSEC
;
;THIS ROUTINE GENERATES A 1.0 OR 0.5 MILLISECOND
;DELAY AND RETURNS AFTER THE DELAY IS COMPLETE
;
DMSEC:                          ;DELAY 1 MILLISECOND
            PUSH    PSW
            MVI     A,124       ;A=124
            INR     A
            JNZ     DMSEC+3
            POP     PSW
            RET
DMS2:                           ;DELAY 0.5 MSEC.
            MVI     A,190
            INR     A
            JNZ     DMS2+2
            RET
;
;ROUTINE:DISP
;
;THIS ROUTINE ALLOWS EITHER 2 OR 4 DIGITS TO BE
;DISPLAYED ON THE DIGITAL READOUT.  IF CARRY IS
;SET ON ENTRY,LEADING ZEROS WILL NOT BE SUPPRESSED.
;IF CARRY IS NOT SET ON ENTRY, LEADING ZEROS WILL BE
;SUPPRESSED.  REGISTER E IS NON ZERO IF ZEROS ARE NOT
;SUPPRESSED.  REGISTER H CONTAINS A LOW BIT WHICH
;DETERMINES WHICH DIGIT IS OUTPUTTED TO(BIT 4
;SELECTS MSD AND BIT 7 SELECTS THE LSD).
;
;INPUTS: A - 2 LSD
;        D - 2 MSD
;        CARRY - HI IF NO ZERO SUPPRESSION
;
;DESTROYS: CARRY
;
NMOT2:                          ;ENTRY POINT FOR 2 DIGIT DISPLAY
                                ;A HAS THE 2 DIGITS
            PUSH    D
            MVI     D,0         ;2 MOST SIGNIFICANT DIGITS = 0
            JMP     NMOT4+1
NMOT4:                          ;ENTRY POINT FOR 4 DIGIT DISPLAY
                                ;D HAS UPPER 2,A HAS LOWER 2
            PUSH    D
            PUSH    H
            PUSH    B
            LXI     H,0FFFFH    ;SELECT FOR MSD
            MVI     E,0
            MOV     B,A         ;SAVE 2 LSD
            JNC     DIS2D       ;JUMP IF LEADING ZEROS SUPPRESSED
            MOV     E,H         ;SHOW LEADING ZEROS
DIS2D:                          ;DISPLAY 2 DIGITS
            MOV     A,D
            RRC
            RRC
            RRC
            RRC                 ;GET UPPER 4 BITS TO LOWER 4 BITS
            ANI     0FH         ;MASK OUT UPPER 4 BITS
            JNZ     ZERO2       ;IF DIGIT (LOWER 4 BITS) IS
                                ;NOT EQUAL TO ZERO, JUMP
            CMP     E
            JNZ     ZERO2+1     ;IF ALL PREVIOUS 0, BLANK
            MVI     A,0FH       ;BLANK DIGIT
            JMP     ZERO2+1     ;SKIP NEXT INSTRUCTION
ZERO2:
            MOV     E,A         ;NON ZERO DIGIT
            CALL    DISOT       ;DISPLAY OUTPUT
            MOV     A,D
            ANI     0FH         ;GET DIGIT 2
            JNZ     ZERO3       ;IF DIGIT(LOWER 4 BITS) IS
                                ;NOT EQUAL TO ZERO, JUMP
            CMP     E
```

```
            JNZ       ZERO3+1      ;IF ALL PREVIOUS 0,BLANK
            ADD       H            ;ZERO UPPER 4 BITS IF DIGIT
                                   ;SELECT IS FOR LSD
            MOV       A,D          ;SET A=XOH
            JP        ZERO3+1      ;IF LSD, DISPLAY 0
            MVI       A,0FH        ;BLANK DIGIT
            JMP       ZERO3+1
ZERO3:
            MOV       E,A          ;NON ZERO DIGIT TO E
            CALL      DISOT        ;DISPLAY OUTPUT
            MOV       A,H          ;GET DIGIT SELECT
            ANA       A            ;SET FLAGS
            MOV       D,B          ;2 LSD TO D
            JPO       DIS2D        ;JUMP IF H HAS A LOW BIT
                                   ;TO SELECT DIGIT
            MOV       A,B          ;RESTORE A FROM BEGINNING
                                   ;VALUE
            POP       B
            POP       H
            POP       D
            RET
DISOT:                             ;DISPLAY OUTPUT
            ORI       0F0H         ;SET UPPER 4 BITS HI
            MOV       C,A
            ANA       H            ;MOVE DIGIT SELECT TO A UPPER 4 BITS
            OUT       DISPY        ;OUTPUT DIGIT
            MOV       A,C          ;RETURN DIGIT VALUE TO A
            OUT       DISPY        ;STORE DIGIT
            DAD       H            ;SHIFT DIGIT SELECT TO NEXT DIGIT
            RET
;
;ROUTINE:SMS
;
;STEPPER MOTOR SPEED
;
;THIS ROUTINE DETERMINES WHETHER THE STEPPER MOTOR IS TO
;BE RAMPING UP OR DOWN OR AT A MAXIMUM OR FIXED SPEED.
;
;DESTROYS:A,H,L,FLAGS
;
SMSPD:
            PUSH      B
            PUSH      D
            LXI       D,STPTB-1    ;STEP TABLE ADDR-1
            LXI       H,MSPDS      ;MAX SPEED STATUS
            MVI       A,80H        ;A=80H
            CMP       M            ;CHECK STATUS
            INX       H            ;M=MAXIMUM SPEED
            MOV       B,M          ;B=MAXIMUM SPEED
            STC                    ;SET CARRY SO THAT CONDITIONAL
                                   ;RETURN WILL OCCUR IF AT MAX SPD
            JZ        SPD01        ;IF MAX SPEED, OUTPUT
            INX       H            ;M=RSTPN(RAMP STEP #)
            MOV       C,M          ;C=RSTPN
            INX       H            ;M=RAMP UP STATUS
            CMP       M            ;M=80?
            DCX       H            ;M=RAMP STEP #
            JZ        URAMP        ;JUMP IF RAMP UP STATUS=80H
DRAMP:                             ;DOWN RAMP
            MOV       A,C          ;RAMP STEP # TO A
            ADD       E            ;ADD RAMP STEP # TO BASE
                                   ;ADDRESS LOCATION
            MOV       E,A          ;BASE + RSTPN RETURNED
            LDAX      D            ;NEW SPEED TO A
            DCR       C            ;DECREASE RSTPN(RAMP STEP #)
            MOV       M,C          ;SAVE RSTPN
            CMP       B            ;CHECK MAX & NEW SPEED
            JC        SPD02        ;NWSPD<MXSPD THEN JUMP
            STC                    ;CARRY CAUSES CONDITIONAL RET
            JMP       SPD01
URAMP:                             ;UP RAMP
            INR       C            ;INCREASE RSTPN(RAMP STEP #)
            MOV       M,C          ;SAVE RSTPN
            MOV       A,C          ;A=RSTPN
            CMA
```

```
            MOV     C,A         ;SAVE COMPLEMENTED STEP NUMBER
            CMA
            ADD     E           ;ADD RAMP STEP # TO BASE LOCATION
            MOV     E,A         ;BASE +RSTPN RETURNED
            LDAX    D           ;NEW SPEED TO A
            CMP     B           ;CHECK MAX & NEW SPEED
            JC      SPD02       ;NVSPD<MXSPD?
MX:                             ;MAXIMUM SPEED REACHED THIS
                                ;TIME
            INX     H           ;M=URAPS(UP RAMP STATUS)
            MVI     M,0         ;CLEAR RAMP UP STATUS
            LXI     H,MSPDS     ;M=MSPDS(MAX SPEED STATUS)
            MVI     M,80H       ;SET MAX SPEED STATUS
            MOV     L,C         ;SAVE PSTPN(RAMP STEP #)
SPD01:
            MOV     A,B         ;A=MXSPD(MAX SPEED)
SPD02:
            OUT     SPDGN       ;TO SPEED GENERATOR
            POP     D
            POP     B
            RC                  ;RETURN IF MAX SPEED WAS NOT
                                ;REACHED THIS TIME
            LDA     NCTMS       ;NO CUT MARK STATUS
            ANA     A           ;SET FLAGS
            JM      RPDNA       ;JUMP IF NO CUT MARK STATUS
            MOV     A,L         ;COMPLEMENTED RAMP DOWN STEPS
            INR     A           ;MAKE TWO'S COMPLEMENT
            LXI     H,ACTF1     ;LOCATION OF TWO LSD OF AFTER
                                ;CUT MARK FEED
            ADD     M           ;SUBTRACT RAMP DOWN STEPS
            MOV     M,A         ;SAVE NEW FEED LENGTH
            RC                  ;RETURN IF CARRY
            INX     H           ;LOCATION OF MSD OF AFTER
                                ;CUT MARK FEED
            DCR     M           ;REDUCE MSD BY ONE
            RET
RPDNA:                          ;RAMP DOWN ADJUSTMENT
            MVI     H,0FFH
            DAD     B           ;REDUCE TOTAL FEED BY RAMP
                                ;DOWN STEPS
            INX     H           ;ADJUST FOR CARRY
            MOV     B,H         ;FEED BEFORE RAMP DOWN
            MOV     C,L         ; TO BC
            RET
;
;ROUTINE:TRIM
;
;THIS ROUTINE ENERGIZES THE CUT SOLENOID FOR THE
;LENGTH OF TIME DETERMINED BY CUTL.  IF ENTRY IS
;MADE AT TRIM1 THE SOLENOID WILL BE TURNED OFF
;AFTER THE PROPER ENERGIZATION TIME.
;
TRIM:
            OUT     CTON        ;TURN CUT SOLENOID ON
            MVI     A,CUTL-3    ;CUT SOLENOID ON TIME
            CALL    DELAY
TRIM1:
            MVI     A,3         ;ENTRY POINT WHEN EARLY CUT
            CALL    DELAY
            OUT     CTOFF       ;TURN CUT SOLENOID OFF
            RET
;
;ROUTINE:DB
;
;THIS IS THE LOOK UP TABLE FOR THE SELECTED SPEED.
;THE STEP RATE IS (41.66 STEPS/SEC)(LOOK UP)
;
            ORG     SPDTB
SPDTB:      DB      1CH,20H,24H,29H,36H     ;SELECT 0-4
            DB      44H,54H,66H,81H,99H     ;SELECT 5-9
;
;THIS IS THE LOOK UP TABLE FOR THE STEPPER MOTOR RAMP.
;
;           SPEED(41.66 STEP/SEC)(LOOKUP)   STEP#
;
```

```
STPTB:   DB    16H,29H,49H,37H,44H,50H,58H       ;1-7
         DB    61H,63H,65H,68H,70H,72H,74H       ;8-14
         DB    76H,78H,79H,82H,83H,83H,84H       ;15-21
         DB    87H,87H,87H,90H,90H,91H,92H       ;22-28
         DB    92H,92H,93H,94H,94H,94H,96H       ;29-35
         DB    96H,97H,98H,98H,99H               ;36-40
;
;ROUTINE:DS
;
         ORG   DSTOR
SWSTM:   DS    1       ;STATUS OF PB & TOGGLE SWITCHES
NCTMS:   DS    1       ;BIT 7 HI,NO CUT MARK STATUS
LONFD:   DS    1       ;BIT 7 HI IF NEW PAPER ROLL
MXPRM:   DS    1       ;MAX NUMBER PRINTS THIS ORDER(BCD)
CTOTM:   DS    1       ;CUT OUT LENGTH-MEMORY(BINARY)
ACTF1:   DS    1       ;2 LSD,FEED AFTER CT MARK(BINARY)
ACTF2:   DS    1       ;MSD,FEED AFTER CUT MARK(BINARY)
MSPDS:   DS    1       ;BIT 7 HI,AT MAX SPEED
MXSPD:   DS    1       ;MAX SPEED
RSTPN:   DS    1       ;RAMP STEP #
URAPS:   DS    1       ;BIT 7 HI,RAMP UP STATUS
RRPDN:   DS    1       ;BIT 7 HI,READY TO RAMP DOWN
ACTM:    DS    1       ;BIT 7 HI,LOOKING FOR END OF PRT
CTVAL:   DS    1       ;BIT 7 HI,CUT MARK IS ACCEPTABLE
MISCM:   DS    1       ;CUT MARK YET TO MISS
PFD1:    DS    1       ;2 LSD OF FEED LAST CUT(BINARY)
PFD2:    DS    1       ;MSD OF FEED LAST CUT(BINARY)
PRCT:    DS    1       ;# OF PRINTS CUT THIS ORDER(BCD)
ORDCT:   DS    3       ;# ORDERS TOTAL(BCD)
PRCT1:   DS    3       ;# PRINTS CUT TOTAL(BCD)
CTMNW:   DS    1       ;BIT 7 HI,CUT MARK ON PRESENT
                       ;(NEW) CUT
CTMOD:   DS    1       ;BIT 7 HI,CUT MARK ON PREVIOUS
                       ;(OLD) CUT
STOPM:   DS    1       ;BIT 7 HI,STOP SELECTED SINCE
                       ;LAST CUT
MFDL:    DS    2       ;MEASURED FEED LENGTH(BCD)
MFDAC:   DS    2       ;MEASURED FEED LENGTH AFTER
                       ;CUT MARK(BCD)
PWRON:   DS    1       ;BIT 7 HI IF PRINTS HAVE BEEN CUT
                       ;SINCE POWER ON & NO ERROR IN LAST ADVANCE
TOT1D:   DS    1       ;BIT 7 HI IF FIRST TOTAL HAS
                       ;BEEN DISPLAYED
DIG4S:   DS    1       ;BIT 7 HI IF UPPER FOUR DIGITS ARE
                       ;TO BE DISPLAYED NEXT
CTELY:   DS    1       ;BIT 7 HI IF CUT SOLENOID IS TO BE
                       ;ENERGIZED EARLY WHEN RAMP DOWN BEGINS
REQCM:   DS    1       ;BIT 7 HI IF CUT MARKS REQUIRED ON ALL PRINTS
WHY:     DS    2       ;CONTAINS ADDRESS OF REASON FOR PAPER CUTTER STOP
         END
```

What is claimed is:

1. A stepper motor control system for controlling operation of a stepper motor, the stepper motor control system comprising:

first storage means for storing a first number indicative of a desired stepper motor speed;

second storage means for storing a sequence of numbers;

processor means for sequentially supplying numbers of the sequence until a number of the sequence equals or exceeds the number indicative of a desired stepper motor speed, and then supplying the number indicative of a desired stepper motor speed;

clock means for providing clock pulses at a predetermined frequency;

rate multiplier means for receiving the numbers supplied by the processor means and producing rate multiplier output pulses, the number of rate multiplier output pulses produced per a first predetermined number of clock pulses being determined by the numbers received, such that the larger the number supplied by the processor means, the larger the number of rate multiplier output pulses produced;

smoothing circuit means for receiving the rate multiplier output pulses and producing a stepper motor clock pulse each time a second predetermined number of rate multiplier output pulses are received; and stepper motor driver means for causing the stepper motor to step in response to the stepper motor clock pulses.

2. The stepper motor control system of claim 1 and further comprising:

means for supplying a first signal to the processor means indicative of a desired stop position;

means for storing a second signal indicative of the number of steps to be taken after the first signal is received;

ramp length storage means for storing the total number of steps in the sequence which were required until a number of the sequence equalled or exceeded the number indicative of a desired stepper motor speed.

3. The stepper motor control system of claim 2 wherein the processor means receives the first signal and causes the stepper motor means to step a number of steps determined by the second signal and sequentially supplies in reverse order the numbers of the sequence previously supplied and then causes the stepper motor drive means to stop.

4. The stepper motor of claim 3 wherein the processor means begins to supply the numbers in reverse order when the number of steps remaining before the stepper motor drive means stops is equal to the total number of steps in the sequence stored by the ramp length storage means.

5. The stepper motor control system of claim 1 wherein the first storage means comprises:
   means for storing a set of numbers, each number indicative of a desired stepper motor speed; and
   select means for selecting one number of the set of numbers to be the first number.

6. A stepper motor control system for controlling operation of the stepper motor, the stepper motor control system comprising:
   motor speed storage means for storing a set of numbers, each number being indicative of a desired stepper motor speed;
   speed select means for selecting one number of the set of numbers;
   up ramp storage means for storing a first sequence of numbers representative of an up ramp;
   start means for providing a start signal;
   processor means for receiving the start signal and sequentially supplying the first sequence of numbers until a number in the first sequence attains the selected number and thereafter supplying the selected number;
   clock means for providing clock pulses at a predetermined frequency;
   rate multiplier means for receiving the numbers supplied by the processor means and producing rate multiplier outpulses, the number of rate multiplier output pulses produced per a first predetermined number of clock pulses being determined by the numbers received, such that the larger the number supplied by the processor means, the larger the number of rate multiplier output pulses produced;
   smoothing circuit means for receiving the rate multiplier output pulses and producing a stepper motor clock signal each time a second predetermined number of rate multiplier output pulses are received;
   stepper motor phase generator means for supplying stepper motor phase signals in response to the stepper motor clock signals; and
   stepper motor driver means for driving the stepper motor in response to the stepper motor phase signals.

7. The stepper motor control system of claim 6 and further comprising:
   down ramp storage means for storing a second sequence of numbers representative of a down ramp.

8. The stepper motor control system of claim 7 wherein the processor means supplies the second sequence of numbers to the stepper motor speed control means to decrease the stepper motor step rates prior to stopping the stepper motor.

9. The stepper motor control system of claim 8 wherein the second sequence is the first sequence in reverse order.

10. The stepper motor control system of claim 9 wherein the up ramp storage means and the down ramp storage means are common storage means and wherein the processor means supplies the numbers in the first sequence in a first order to provide an up ramp in stepper motor step rates and in a second, reverse order, to provide a down ramp in stepper motor step rates.

11. A stepper motor control system comprising:
    first storage means for storing a first table of numbers indicative of desired stepper motor speeds;
    second storage means for storing a second table of numbers in a sequence representing desired stepper motor speeds during an up ramp in stepper motor speed;
    third storage means for storing a third table of stored numbers representing desired stepper motor speeds during a down ramp in stepper motor speed;
    select switch means for selecting a desired maximum stepper motor speed by selecting a number from the first table;
    processor means for controlling the operation of a stepper motor as a function of the first, second and third tables and the state of the select switch means by selectively supplying numbers from the first, second, or third tables;
    clock means for providing clock pulses at a predetermined frequency;
    rate multiplier means for receiving the numbers supplied by the processor means and producing rate multiplier output pulses, the number of rate multiplier output pulses produced per a first predetermined number of clock pulses being determined by the numbers received, such that the larger the number supplied by the processor means, the larger the number of rate multiplier output pulses produced;
    smoothing circuit means for receiving the rate multiplier output pulses and producing a stepper motor clock signal each time a second predetermined number of rate multiplier output pulses are received;
    stepper motor phase generator means for supplying stepper motor phase signals in response to the stepper motor clock signals; and
    stepper motor driver means for driving the stepper motor in response to the stepper motor phase signals.

12. A stepper motor control system for controlling operation of a stepper motor, the stepper motor control system comprising:
    storage means for storing a plurality of numbers;
    processor means for supplying selected numbers of the plurality;
    clock means for providing clock pulses at a predetermined frequency;
    rate multiplier means for receiving the numbers supplied by the processor means and producing rate multiplier output pulses, the number of rate multiplier output pulses produced per a first predetermined number of clock pulses being determined by the numbers received, such that the larger the number supplied by the processor means, the larger the number of rate multiplier output pulses produced;
    smoothing circuit means for receiving the rate multiplier output pulses and producing a stepper motor clock signal each time a second predetermined number of rate multiplier output pulses are received;
    stepper motor phase generator means for supplying stepper motor phase signals in response to the stepper motor clock signals; and
    stepper motor driver means for driving the stepper motor in response to the stepper motor phase signals.

* * * * *